US012694668B2

(12) United States Patent
Cartwright et al.

(10) Patent No.: US 12,694,668 B2
(45) Date of Patent: Jul. 28, 2026

(54) METHODS AND SYSTEMS FOR ASSIGNING A TASK TO A CONSTELLATION OF SATELLITES

(71) Applicant: ICEYE Oy, Espoo (FI)

(72) Inventors: John Kenneth Cartwright, Denver, CO (US); Sagar Dubey, Helsinki (FI); Rodrigo Diez Villamuera, London (GB)

(73) Assignee: ICEYE OY, Espoo (FI)

( * ) Notice: Subject to any disclaimer, the term of this patent is extended or adjusted under 35 U.S.C. 154(b) by 281 days.

(21) Appl. No.: 18/524,675

(22) Filed: Nov. 30, 2023

(65) Prior Publication Data

US 2025/0182471 A1 Jun. 5, 2025

(51) Int. Cl.
*G06V 20/13* (2022.01)

(52) U.S. Cl.
CPC .......... *G06V 20/13* (2022.01); *G06V 2201/07* (2022.01)

(58) Field of Classification Search
CPC .. G06V 20/13; G06V 2201/07; B64G 1/1085; B64G 1/1021
See application file for complete search history.

(56) References Cited

U.S. PATENT DOCUMENTS

2014/0039963 A1 2/2014 Augenstein et al.
2016/0344685 A1* 11/2016 Maharaja ............... B64G 1/244

2021/0036767 A1* 2/2021 Devaraj ................. H04B 7/195
2022/0135256 A1* 5/2022 Tallhamn ............. B64G 1/1085
244/158.8
2022/0164376 A1* 5/2022 Lopez ................. G06F 16/9535

FOREIGN PATENT DOCUMENTS

CN 116016207 A 4/2023
WO 2023052270 A1 4/2023

OTHER PUBLICATIONS

Canopy Guides, webpage <https://docs.canopy.umbra.space/docs>, [retrieved on Nov. 3, 2025]. Retrieved from the Internet Archive Wayback Machine <https://web.archive.org/web/20230818114213/https://docs.canopy.umbra.space/docs>, [published on Oct. 2, 2023]. (Year: 2023).*

(Continued)

*Primary Examiner* — Edward Park
*Assistant Examiner* — Alexander Joseph Vaughn
(74) *Attorney, Agent, or Firm* — Cozen O'Connor

(57) ABSTRACT

Methods, systems, and techniques for assigning an image acquisition task to a constellation of satellites may be performed by first receiving a request via an inbound API call to assign the image acquisition task to the constellation of satellites. The request may include a time at or during which at least one image is to be acquired by the constellation. Based on the request, at least one task performance rule specifying how the task is to be performed is retrieved. At least one internal API call is generated to task the constellation of satellites to perform the task. The at least one API call specifies the time at or during which the task is to be performed and the at least one task performance rule. The task is then assigned to be performed by the constellation of satellites by making the at least one internal API call.

20 Claims, 21 Drawing Sheets

Coverage on Earth of a single satellite path in 24 hours

(56)  References Cited

OTHER PUBLICATIONS

"Airbus: Oneatlas Developer Portal," webpage <https://www.geoapi-airbusds.com/guides/oneatlas-basemap/g-oab-stream-api/>, last accessed on Apr. 2, 2025.

"Capella Space Documentation," webpage <https://docs.capellaspace.com/>, 2 pages, Oct. 4, 2023, retrieved from Internet Archive Wayback Machine <https://web.archive.org/web/20231004004104/https://docs.capellaspace.com/> on Jan. 16, 2025.

"Create Feasibility," webpage <https://docs.canopy.umbra.space/reference/create_feasibility>, 3 pages, 2023 Internet Archive Wayback Machine <https://web.archive.org/web/20231002202418/https://docs.canopy.umbra.space/reference/create_feasibility on 2025.

"Get Started with Planet APIs," webpage <https://developers.planet.com/quickstart/apis/>, 5 pages, 1, retrieved from Internet Archive Wayback Machine <https://web.archive.org/web/20231126220639/https://developers.planet.com/quickstart/apis/> on Jan. 16, 2025.

"Maxar Catalog API," webpage <https://doc.content.maxar.com/index.html>, 5 pgs, 2023, retrieved from Internet Archive Wayback Machine <https://web.archive.org/web/20230201181342/https://doc.content.maxar.com/index.html> on 2025.

"Up42 Docs," webpage < https://docs.up42.com/developers>, 2 pages, Sep. 26, 2023, retrieved from Internet Archive Wayback Machine <https://web.archive.org/web/20230926200140/https://docs.up42.com/developers> on Jan. 16, 2025.

Baek, et al. "Development of a scheduling algorithm and GUI for autonomous Satellite Missions. Baek, Seung-Woo et al. Development of a scheduling algorithm and GUI for autonomous satellite missions." Acta Astronautica 68 (2011): 1396-1402.

Dilkina, B., Havens, B. Agile "Satellite Scheduling via Permutation Search with Constraint Propagation". Actenum Corporation, May 31, 2005.

Extended EP Search Report mailed Jul. 6, 2023, EP App No. 23155668.9-1206, 8 pages.

Frank, et al, "Planning and Scheduling for Fleets of Earth Observing Satellites". Proceeding of the 6th International Symposium on Artificial Intelligence and Robotics & Automation in Space: i-SAIRAS 2001, Canadian Space Agency, St-Hubert, Quebec, Canada.

Lai, et al: "OrbitCast: Exploiting Mega-Constellations for Low-Latency Earth Observation", 2021 IEEE 29th International Conference on Network Protocols (ICNP), IEEE, Nov. 1, 2021.

Lv Mingsong et al: "Task Allocation for Real-time Earth Observation Service with LEO Satellites", 2022 IEEE Real-Time Systems Symposium (RTSS), IEEE, Dec. 5, 2022.

PCT Search Report and Written opinion from PCT Application No. PCT/FI2024/050643 dated Feb. 14, 2025, 10 pages.

Sundar, et al. "Algorithms for a Satellite Constellation Scheduling Problem". 2016. In IEEE International Conference on Automation Science and Engineering (pp. 373-378). Article 7743431 (IEEE International Conference on Automation Science and Engineering).

Teske, et al. "Distributed Satellite Collection Scheduling Optimization using Cooperative Coevolution and Market-Based Techniques": 2020 IEEE International Systems Conference.2020, Montreal, Quebec, Canada, pp. 1-8. DOI: 10.1109/SysCon47679.2020.9381835.

* cited by examiner

Coverage on Earth of a single satellite path in 24 hours

Coverage on Earth of 18 (or similar) satellite path in 3 hours - (18 sat 3 h)

Coverage on Earth of 18 (or similar) satellite path in 24 hours

810 — 18 sat, 3 days, Tokyo

| Anx | Area covered | Duration | End | Intersection Area | Length | Look Angle | Pass | Satellite | Sensor |
|---|---|---|---|---|---|---|---|---|---|
| 2018-Mar-21 12:35:55 126 | 100.00% | 10 | 2018-Mar-21 15:45:23 304 | 538.5975266 | 71.73651146 | 14.61405682 | ASCENDING | ICEYE X1 | LEFT |
| 2018-Mar-22 01:07:13 387 | 60.44% | 10 | 2018-Mar-22 01:44:48 865 | 325.5071074 | 71.77465319 | 28.88282264 | DESCENDING | ICEYE X1 | LEFT |

812 — 18 sat, 3 days, Tokyo

| Anx | Area covered | Duration | End | Intersection Area | Length | Look Angle | Pass | Satellite | Sensor |
|---|---|---|---|---|---|---|---|---|---|
| 2018-Mar-21 04:51:51 719 | 100.00% | 10 | 2018-Mar-21 05:01:08 872 | 538.5975266 | 71.9710091 | 28.10745154 | ASCENDING | ICEYE-BLOCK1.1.2 | RIGHT |
| 2018-Mar-21 12:35:06 235 | 100.00% | 10 | 2018-Mar-21 12:44:31 142 | 538.5975266 | 72.13999719 | 17.41635605 | ASCENDING | ICEYE-BLOCK1.2.2 | LEFT |
| 2018-Mar-22 01:02:02 195 | 100.00% | 10 | 2018-Mar-22 01:39:27 300 | 538.5975266 | 72.1482228 | 21.86044642 | DESCENDING | ICEYE-BLOCK1.2.2 | LEFT |
| 2018-Mar-20 18:50:34 751 | 100.00% | 10 | 2018-Mar-20 18:59:52 455 | 538.5975266 | 71.99196903 | 24.77364605 | ASCENDING | ICEYE-BLOCK1.3.1 | RIGHT |
| 2018-Mar-23 08:45:16 705 | 100.00% | 10 | 2018-Mar-23 09:22:49 779 | 538.5975266 | 72.00237178 | 23.90022439 | DESCENDING | ICEYE-BLOCK1.3.2 | RIGHT |
| 2018-Mar-21 08:04:24 627 | 100.00% | 10 | 2018-Mar-21 08:39:56 291 | 538.5975266 | 68.97210287 | 26.05651117 | DESCENDING | ICEYE-BLOCK2.1.1 | LEFT |
| 2018-Mar-22 07:22:25 911 | 97.90% | 10 | 2018-Mar-22 07:57:10 526 | 527.3001139 | 68.84656088 | 16.41429236 | DESCENDING | ICEYE-BLOCK2.1.1 | RIGHT |
| 2018-Mar-23 07:27:03 249 | 8.27% | 10 | 2018-Mar-23 08:02:48 316 | 44.55641461 | 68.97019709 | 34.85790584 | DESCENDING | ICEYE-BLOCK2.1.2 | LEFT |
| 2018-Mar-21 15:50:24 730 | 28.18% | 10 | 2018-Mar-21 16:24:41 163 | 151.7990464 | 68.94738041 | 15.41032965 | ASCENDING | ICEYE-BLOCK2.2.1 | LEFT |
| 2018-Mar-21 08:04:24 383 | 100.00% | 10 | 2018-Mar-21 08:15:48 887 | 538.5975266 | 68.95037568 | 19.0414597 | ASCENDING | ICEYE-BLOCK2.2.1 | LEFT |
| 2018-Mar-22 15:08:25 767 | 100.00% | 10 | 2018-Mar-22 15:42:54 194 | 538.5975266 | 68.76267414 | 27.00367841 | DESCENDING | ICEYE-BLOCK2.2.1 | RIGHT |
| 2018-Mar-21 08:09:01 458 | 100.00% | 10 | 2018-Mar-21 08:21:28 529 | 538.5975266 | 68.7082421 | 32.85757276 | ASCENDING | ICEYE-BLOCK2.2.2 | RIGHT |
| 2018-Mar-20 15:45:47 669 | 4.31% | 10 | 2018-Mar-20 16:20:01 142 | 23.21514483 | 68.69908692 | 34.90591326 | DESCENDING | ICEYE-BLOCK2.2.2 | RIGHT |
| 2018-Mar-21 15:50:27 714 | 100.00% | 10 | 2018-Mar-21 16:01:36 097 | 538.5975266 | 68.9693602 | 31.32051391 | ASCENDING | ICEYE-BLOCK2.3.1 | LEFT |
| 2018-Mar-22 15:55:04 889 | 100.00% | 10 | 2018-Mar-22 16:07:14 541 | 538.5975266 | 68.80687266 | 21.78590351 | ASCENDING | ICEYE-BLOCK2.3.2 | RIGHT |

Request ground station availability — *1302*

Receive new order — *1303*

Recalculate execution sets — *1304*

Recalculate schedule — *1306*

Update ground station bookings — *1308*

Upload new schedule — *1310*

Provide delivery parameters to customer — *1312*

Execute order — *1314*

METHODS AND SYSTEMS FOR ASSIGNING A TASK TO A CONSTELLATION OF SATELLITES

FIELD

The present disclosure relates to satellite networks and in particular to methods and systems for assigning tasks to a satellite network.

BACKGROUND

When a satellite network operator receives a task, such as an image acquisition request, the request must be transmitted (e.g. uplinked) to a particular satellite in the network. A given acquisition request will typically identify an area on the Earth that is to be imaged. Therefore, depending on each satellite's orbit, a given satellite may take more or less time to find itself in a position such that it may perform the acquisition. Added to this is the fact that each task may include additional constraints that must be taken into account, such as a desired time of acquisition and the resources available to perform the task.

If there is a relatively low number of satellites in the fleet, deciding which task to allocate to which satellite may not be particularly burdensome. However, as the fleet of satellites expands, it becomes more and more impractical for a human operator to rapidly and efficiently manage and schedule acquisitions, downlinks, and any other tasks across the whole fleet.

SUMMARY

According to a first aspect, there is provided a method for assigning an image acquisition task to a constellation of satellites, the method comprising: receiving a request via an inbound API call to assign the image acquisition task to the constellation of satellites, wherein the request comprises a time at or during which at least one image is to be acquired by the constellation; retrieving, based on the request, at least one task performance rule specifying how the task is to be performed; generating at least one internal API call to task the constellation of satellites to perform the task, wherein the at least one API call specifies the time at or during which the task is to be performed and the at least one task performance rule; and assigning the task to be performed by the constellation of satellites by making the at least one internal API call.

The inbound API call may further comprise a reference to a set of task performance rules comprising the at least one task performance rule and specific to a user making the inbound API call.

The method may further comprising, after the task has been assigned: receiving a subsequent inbound API call specifying the set of task performance rules; and responding to the subsequent inbound API call specifying the task and any other tasks governed by the set of task performance rules.

The request may further comprise a point of interest to be imaged and an imaging mode. The imaging mode may specify a ground resolution of the at least one image to acquire and dimensions of an area comprising the point of interest to image, and the at least one internal API call may further specify the point of interest and the imaging mode.

The method may further comprise responding to the request with a response comprising at least one of a task identifier identifying the task, a rules identifier identifying a set of task performance rules under which the task is to be performed, a start time and an end time of an acquisition window during which the at least one image is to be acquired, the point of interest, the imaging mode, a status of the task, a time when the task was created, a time when the task was first updated, or an image format type of the at least one image.

The at least one internal API call may further specifies a task priority. The task may be one of a plurality of competing tasks that have been assigned to the constellation of satellites, and the method may further comprise performing the task ahead of at least some of the plurality of competing tasks that have been earlier assigned than the task based on the task priority.

The at least one internal API may further specify at least one additional parameter. The at least one additional parameter may be at least one of a list of satellites comprising the constellation, a pass direction parameter specifying a pass direction of the constellation of satellites when imaging, a look side direction parameter specifying a look side of the constellation of satellites when imaging, a downlink latency parameter specifying a maximum download latency for the constellation of satellites when sending the at least one image to a ground station, a ground assets parameter specifying a location of the ground station, or an incidence angle parameter specifying an incidence angle of the constellation of satellites when imaging.

At least one value for the at least one additional parameter may be specified in the at least one task performance rule.

The at least one internal API call may be made to at least one of a catalog API for permitting searching of an image catalog and downloading of acquired images, an opportunities API for retrieving passes to be made by the constellation of satellites to permit estimation of when the at least one image may be captured, an orders API for data conversion to permit calling the at least one internal API and to generate a task identifier, or a customers API for verifying an identity of a customer requesting performance of the task.

The method may further comprise determining that the constellation of satellites is technically capable of performing the task prior to assigning the task to the constellation of satellites for performance.

The method may further comprise determining that the task can be performed in accordance with the at least one task performance rule prior to assigning the task to the constellation of satellites for performance.

The method may further comprise, prior to assigning the task to the constellation of satellites for performance: determining that the constellation of satellites is technically capable of performing the task; and determining that the task can be performed in accordance with the at least one task performance rule.

The method may further comprise responding to the request with a copy of or link to the at least one image acquired as a result of performing the task.

The method may further comprise verifying an identity of a user making the inbound API call and that the user is permitted to cause the constellation of satellites to perform the task after receiving the request and before generating the at least one internal API call.

The method may further comprise: responding to the request with a response comprising a task identifier identifying the task; and after the task has been assigned: receiving a subsequent inbound API call specifying the task identifier and requesting a status of the task; determining a status of the task; and responding to the subsequent inbound API call with the status of the task.

Responding to the request, and receiving and responding to the subsequent inbound API call may be performed synchronously; and determining the status of the task may at least be partially performed asynchronously.

Generating the at least one internal API call may comprise routing the inbound API call to at least one API family based at least on a base URL of the inbound API call.

The at least one API family may comprise different API families and the at least one internal API call comprises different internal API calls made to different internal APIs, and at least one of the different API families may call multiple of the different internal APIs.

According to another aspect, there is provided a system for assigning a task to a constellation of satellites, the system comprising at least one network interface card; and at least one controller communicatively coupled to the network interface card and configured to perform the above method.

According to another aspect, there is provided at least one non-transitory computer readable medium having stored thereon computer program code that is executable by at least one processor and that, when executed by the at least one processor, causes the at least one processor to perform the above method.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which:

FIG. 8B is a pair of tables showing acquisition opportunities to acquire an image of Tokyo in scenarios having 1 and 18 Earth observation satellites, respectively;

DETAILED DESCRIPTION

Figure 1:
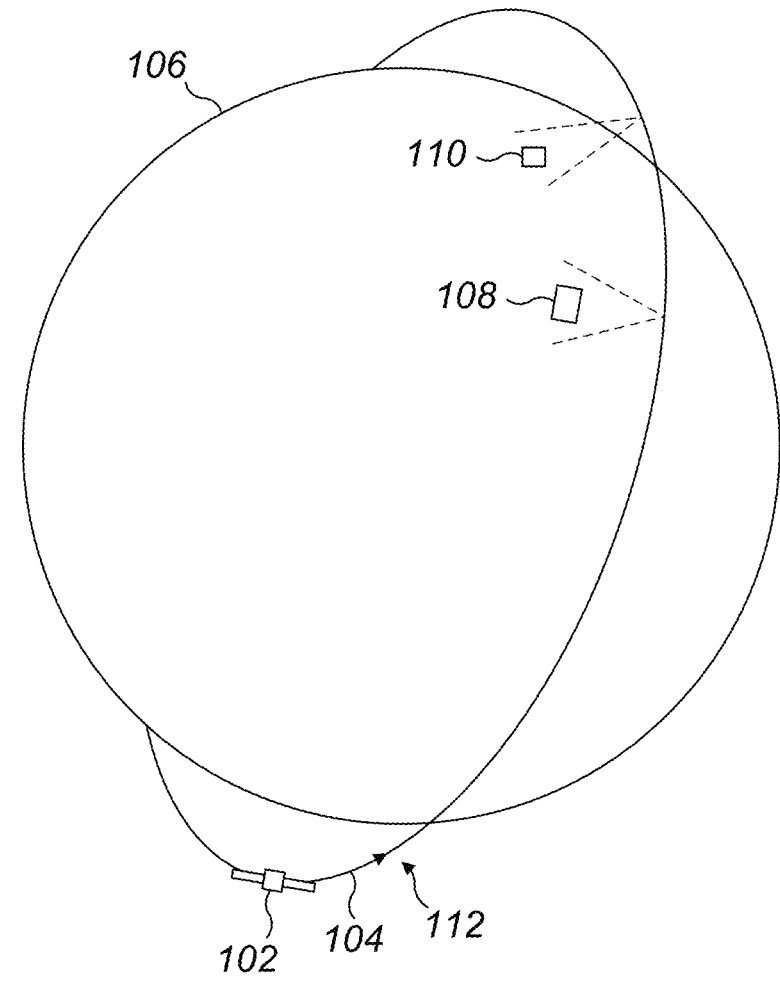
FIG. 1 is a perspective view of the Earth, a satellite, and a ground station.

The present disclosure seeks to provide methods and systems for assigning tasks to a network of satellites. While various embodiments of the disclosure are described below, the disclosure is not limited to these embodiments, and variations of these embodiments may well fall within the scope of the disclosure which is to be limited only by the appended claims.

Generally, according to embodiments of the disclosure, there are described computer-implemented methods in which one or more tasks are received. Each task may be, for example, an image acquisition request that identifies an area of the Earth that is to be imaged. For each task, one or more opportunities are identified. Each opportunity corresponds to a satellite from the network of satellites potentially performing the task. For example, it may be determined that certain satellites are incapable of executing the task within the constraints defined in the task, and therefore no opportunities would be identified for such satellites. Any satellite that may be able to perform the task within the constraints defined in the task, as well as within constraints specific to the satellite, may have a corresponding opportunity associated with the satellite.

For each opportunity, a scheduling score is generated. Generating the scheduling score may comprise generating, for each opportunity, an initial score, and then generating, for each opportunity, the scheduling score by optimizing each initial score based on one or more optimization constraints. Based on each scheduling score, at least one of the one or more tasks is assigned to the satellite corresponding to an opportunity identified for at least one task. Assigning the tasks in this manner may comprise generating a set of one or more activities and then transmitting the set of activities to the satellite. Each activity may have an associated execution time that indicates the point in time at which the satellite is to execute the activity. The activities may include, for example, performing the task, such as the image acquisition, and then downlinking the acquired image.

For example, according to some embodiments, a request for an image acquisition (or simply "acquisition") is added to a database. The request comprises, among other data, the location of the desired acquisition (Area of Interest—AoI) and the desired time of the acquisition. The request is also assigned a priority, for example based on business value. For instance, the customer making the request may agree to pay more for the priority of the request to be increased. The request may additionally include the type of acquisition that is to be made.

At a regular interval, tasks are fetched from the database. For each task, data from an Orbit Determination service is used to determine the time at which one or more satellites of the fleet will be passing over (the "overpass time") the AoI. For each satellite that will be passing over the AoI, if the satellite is not already scheduled to perform a task at the overpass time, or if the satellite is scheduled to perform a lower-priority task at the overpass time, then the overpass time is stored and referred to as an opportunity.

Each opportunity is then assigned a score based, for example, on the amount of time between the overpass time and the desired time of acquisition, the capacity and capability of the satellite, and also future downlink availability for the satellite, for example how soon after acquisition the satellite will be in a position to downlink the acquired image to a ground station. The future downlink availability could also be based on other factors such as an indication of whether a downlink is available within a certain specified amount of time, the cost of the downlink, the speed of the downlink, or others.

The highest-scoring opportunity is selected, and events or activities are created in that satellite's schedule in order to action the acquisition and downlink. The schedule is then transferred to the satellite, replacing any previous version assigned to the satellite.

According to some embodiments, at each pass of a satellite over a ground station, a schedule is uploaded to the satellite. This schedule contains time-stamped commands for the satellite to perform. For example, the satellite may be tasked to perform an image acquisition (or simply "acquisition"), downlink previously acquired images to a ground station, or perform one or more manoeuvres.

Other constraints may be taken into consideration when determining to which satellite a given task is to be assigned. For example, as explained above, a priority (such as a business-related priority) may be assigned to the task. In certain cases, tasks will not be assigned to a given satellite if, for example, the satellite is incapable of performing the task because of, for example, scheduled maintenance, the technical capabilities of the satellite, or other reservations of the satellite's time that cannot be rescheduled.

Advantageously, tasks that are received (for example, from a customer of the network operator) are automatically scheduled and assigned to appropriate satellites within the fleet. The downlink of any image data that is acquired may also be scheduled in a way that minimises the delay between acquisition and downlink. For example, the satellite's overpass time relative to one or more ground stations, as well as the ground stations' capacities and any business rules surrounding their use, may be determined. Based on this data, one or more downlink activities may be generated and assigned to the satellite after the acquisition has been executed.

Generally, the methods and systems described herein may allow for timely planning, capture, and delivery of acquisitions, and in particular acquisitions by Synthetic Aperture Radar (SAR) satellites. In a relatively short period of time, it may be possible to determine which satellite will be passing over the AoI at the desired time, and if the satellite is capable of handling the acquisition. The task may then be transformed into one or more activities for a specific satellite and scheduled on that satellite. The process may allow for more efficient usage of the fleet, and more effective prioritisation of requests.

Generally, although not exclusively, embodiments of the disclosure may relate to methods and systems for assigning tasks to a network of Synthetic Aperture Radar (SAR) satellites. SAR images are a type of image created by transmitting radar signals, receiving the reflected and scattered radar return signals, and processing the return signals in order to form an image. This is in contrast to optical imagery, a passive technology wherein images are captured by receiving light reflected or originating from an object. SAR technology, on the other hand, is an active rather than a passive technology since it relies on transmitting a radar signal rather than relying on sunlight or other light sources. A significant advantage of SAR technology over optical imagery is that SAR technology can image at night as well as through clouds and other adverse weather conditions. However, forming an image using SAR technology is generally more complex and generally requires significant signal processing of the returned echoes in order to decode them.

More particularly, SAR images are typically acquired from an aerial transmitter and receiver, such as a transmitter that comprises part of an airplane or a satellite. In conventional radar, the resolution of an image generated by measuring reflections of a radar signal is directly proportional to the wavelength of the radar signal and, consequently, the length of the antenna used to transmit and receive the radar signal. This means that the length of the antenna that would be required to capture high resolution images using conventional radar is often impractical, particularly for airborne use.

In contrast, SAR images are captured using a "synthetic aperture". A shorter and consequently more practical antenna is used on a moving platform to make a series of measurements of reflected radar signals, and those measurements are combined to simulate a much larger antenna. Consequently, the resolution of a SAR image corresponds to the resolution of a conventional radar image captured using an antenna much larger than the one used to capture the SAR image.

Scheduling tasks for a network of SAR satellites can also be quite different from scheduling tasks for optical satellites, and as such satellite scheduling techniques developed primarily for optical satellites cannot be applied directly for scheduling a network of SAR satellites. In addition to the differences mentioned above, optical satellites typically image straight down, whereas SAR satellites cannot image straight down due to the overly strong radar reflection from the nadir (the point on the ground directly underneath the satellite). Instead, SAR satellites are typically "side-looking", meaning that they image at an angle to the side within a certain range of "look angles", as described in more detail below with reference to FIG. 18. The look angle can for example be from 15 degrees to 45 degrees. The look angle can be looking to the left or the right (some SAR satellites can be rotated to do either). Look angle and the direction (left or right) are parameters comprised within the imaging geometry. While this can increase the potential coverage of the SAR satellite compared to optical satellites that are constrained to pointing straight down, it also makes the scheduling of the satellites more complex and requires for example at least a different and more capable opportunity generator than what could be used for an optical satellite.

Different constraints may also factor into the scoring for SAR satellites as compared to optical satellites. Although SAR satellites have some advantages over optical satellites that simplify scheduling, for example being able image through clouds and during both day and night so that weather does not have to be taken into account, they have other constraints that can make it more complex to schedule. For example, due to the power requirements of sending and receiving SAR signals (particularly sending), the imaging time of small SAR satellites during a particular orbit can be limited, for example to 90 seconds or 120 seconds during a 90-minute orbit. These differences mean that prior art systems designed mainly for optical and other non-SAR satellites cannot automatically be applied to networks of SAR satellites.

Figure 18:
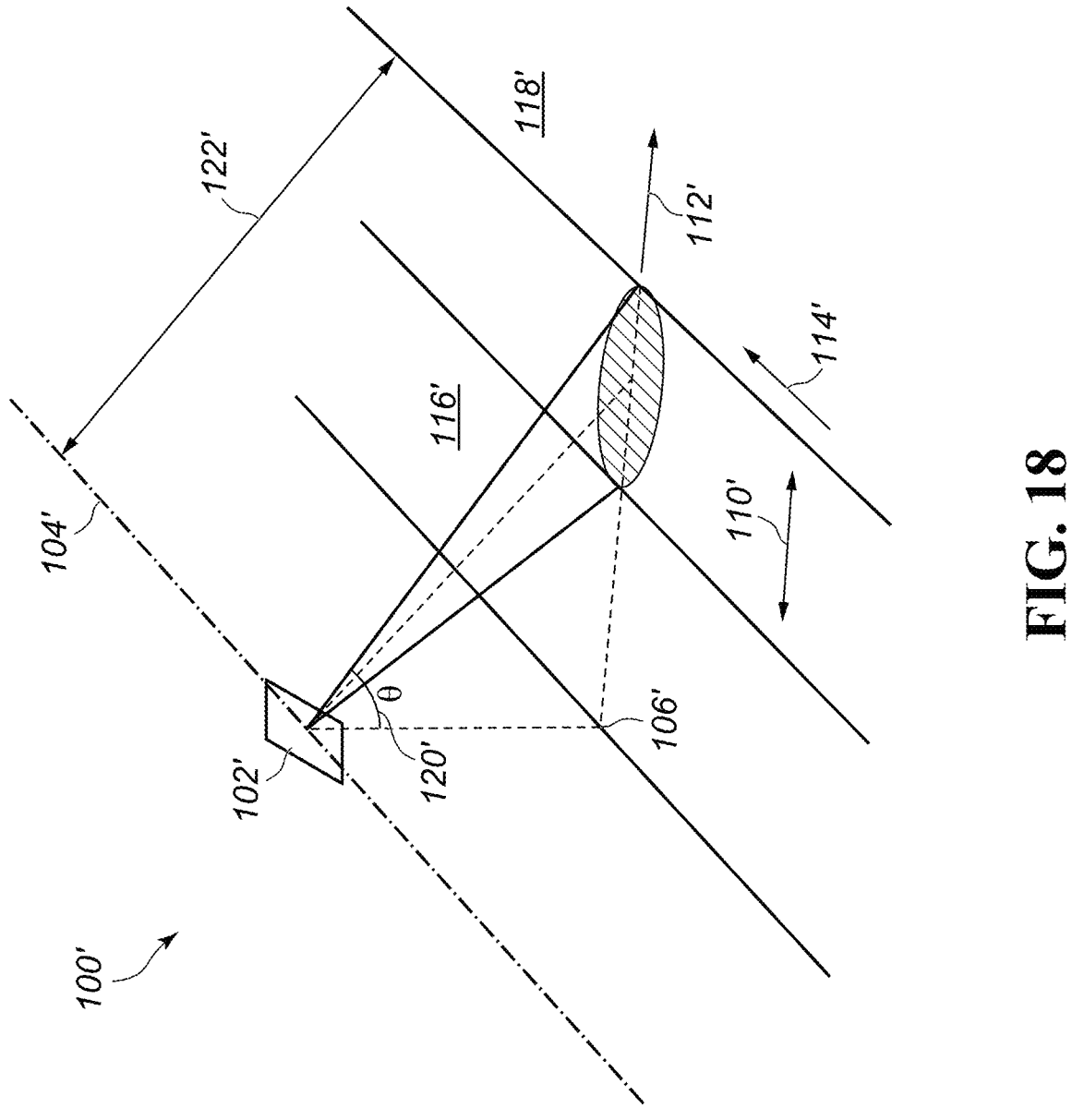
FIG. 18 depicts a system for capturing synthetic aperture radar images.

Referring first to FIG. 18, there is shown a system 100' for capturing synthetic aperture radar ("SAR") images. More particularly, FIG. 18 shows schematically how an aerial antenna 102' is used to capture SAR images. Antenna 102' may be satellite- or airplane-mounted, for example. Antenna 102' travels along a flight path 104', and directly below antenna 102' is the nadir 106'. Antenna 102' emits a radar signal 108' at a look angle 120' that illuminates a swath 110' on the ground, which is offset from nadir 106'. Antenna 102' measures the radial line of sight distance between antenna 102' and the surface along a slant range 122'. FIG. 18 also shows a range direction 112' and an azimuth direction 114', with range direction 112' extending perpendicularly away from flight path 104', and azimuth direction 114' extending parallel to flight path 104'. In respect of range direction 112', the swath 110' is between points along range direction 112' referred to as the near range 116' and the far range 118'.

Figure 14:
FIG. 14 depicts a block diagram of a computer system that may be used to assign tasks to a network of satellites.
Figure 14:
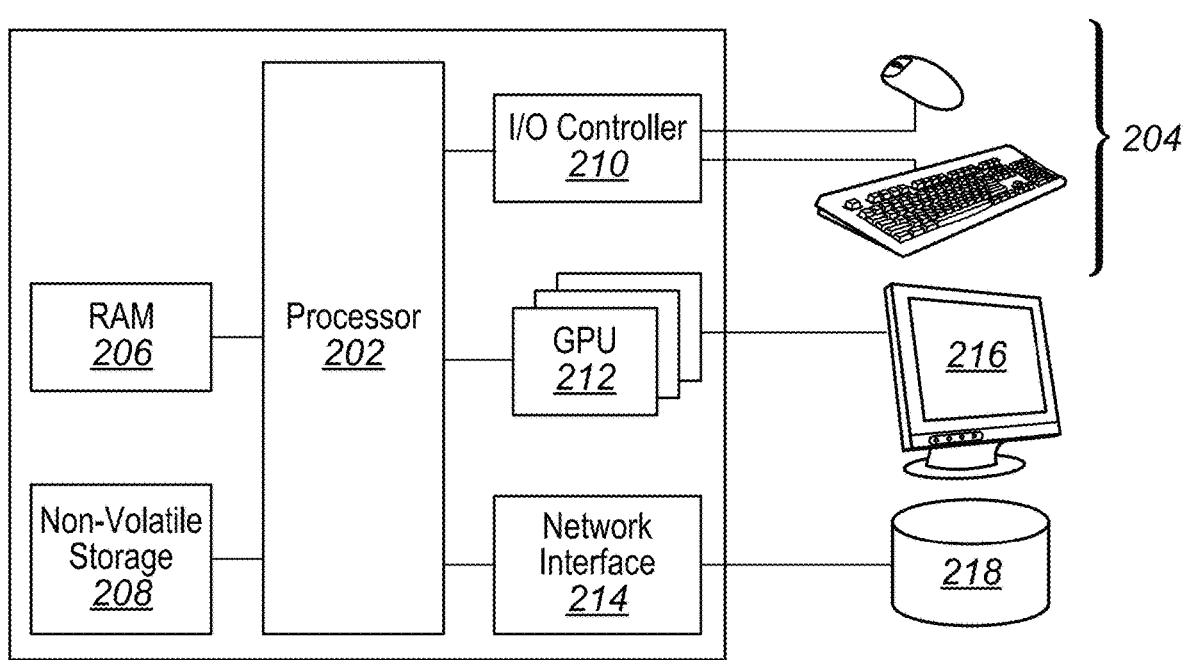

Referring now to FIG. 14, there is depicted an example embodiment of a computer system 200 that may be used to perform a method for assigning tasks to a network of satellites, as described in further detail below. Computer system 200 comprises a processor 202 that controls computer system's 200 overall operation. Processor 202 is communicatively coupled to and controls several subsystems. These subsystems comprise an input/output ("I/O") controller 210, which is communicatively coupled to user input devices 204. User input devices 204 may comprise, for example, any one or more of a keyboard, mouse, touch screen, and microphone. The subsystems further comprise random access memory ("RAM") 206 which stores computer program code for execution at runtime by processor 202; non-volatile storage 208 which stores the computer program code executed by RAM 206 at runtime; graphical processing units ("GPU") 212 which control a display 216; and a network interface 214 which facilitates network communications with a database 218. Non-volatile storage 208 has stored on it computer program code that is loaded into RAM 206 at runtime and that is executable by processor 202. When the computer program code is executed by processor 202, processor 202 causes computer system 200 to implement a method assigning tasks to a network of satellites, such as described further below. Additionally or alternatively, multiple of computer systems 200 may be networked together and collectively perform that method using distributed computing.

Turning now to FIG. 1, there is illustrated a satellite 102 (such as a SAR satellite) in an orbit 104 around the Earth 106. The satellite's trajectory includes passing over a location 108 to be imaged by satellite 102 and a ground station 110 configured to communicate data to and from satellite 102. A new request to acquire an image of location 108 may be submitted to a ground station 110 after satellite 102 is launched. In this case, the tasking of the request must be communicated to satellite 102 via an uplink from Earth 106. FIG. 1 shows a single ground station 110. In a practical implementation, multiple ground stations are spread around Earth 106 and may be used by many customers to communicate with their satellites. Once a request to "book" time at a ground station is sent, the ground station crew will typically need time to queue up the required transmission for either uplinking or downlinking.

In an example, satellite 102 is orbiting Earth 106 in a low-earth orbit. A low-earth orbit can be from 160 km to 1000 km above the surface of Earth 106. Examples of Earth-monitoring satellites can have orbits of between 450 km and 650 km above Earth 106. In some embodiments, a satellite has an orbit that is approximately 550 km above Earth's surface. At an orbit of 550 km above Earth 106, for example, the satellite is effectively traversing the ground at about 7.5 km/s, or 27,000 km/h. Most satellites in this orbit will traverse Earth 106 at a speed that is in the range of 7-8 km/s.

In an example, satellite 102 uses synthetic aperture radar to image Earth 106 in all manner of conditions, including through cloud, fog, smoke, and at night. Satellite 102 can also use reflectors or phased-array antennas to help direct the synthetic aperture radar beam.

In the example of FIG. 1, the uplink to satellite 102 in low-earth orbit is provided by ground station 110. As satellite 102 moves along orbit 104 in the direction shown by arrow 112, it first passes over location 108 and then passes over ground station 110. As a result, in this example a new request uplinked at ground station 110 to satellite 102 to image location 108 cannot be carried out until the satellite's next pass over location 108. This builds a delay into the process.

When satellite 102 passes over ground station 110, the order is uplinked by being transmitted from ground station 110 to satellite 102. The next time satellite 102 passes over location 108, the image can be acquired.

There may be a considerable amount of time before satellite 102 next passes over location 108. When satellite 102 has completed a full orbit, Earth 106 will have rotated through a small angle so that satellite 102 will no long pass directly over location 108. Earth 106 may need to undergo several full rotations (taking several days) before satellite 102 passes over location 108 again and is able to acquire the requested image.

Figure 2:
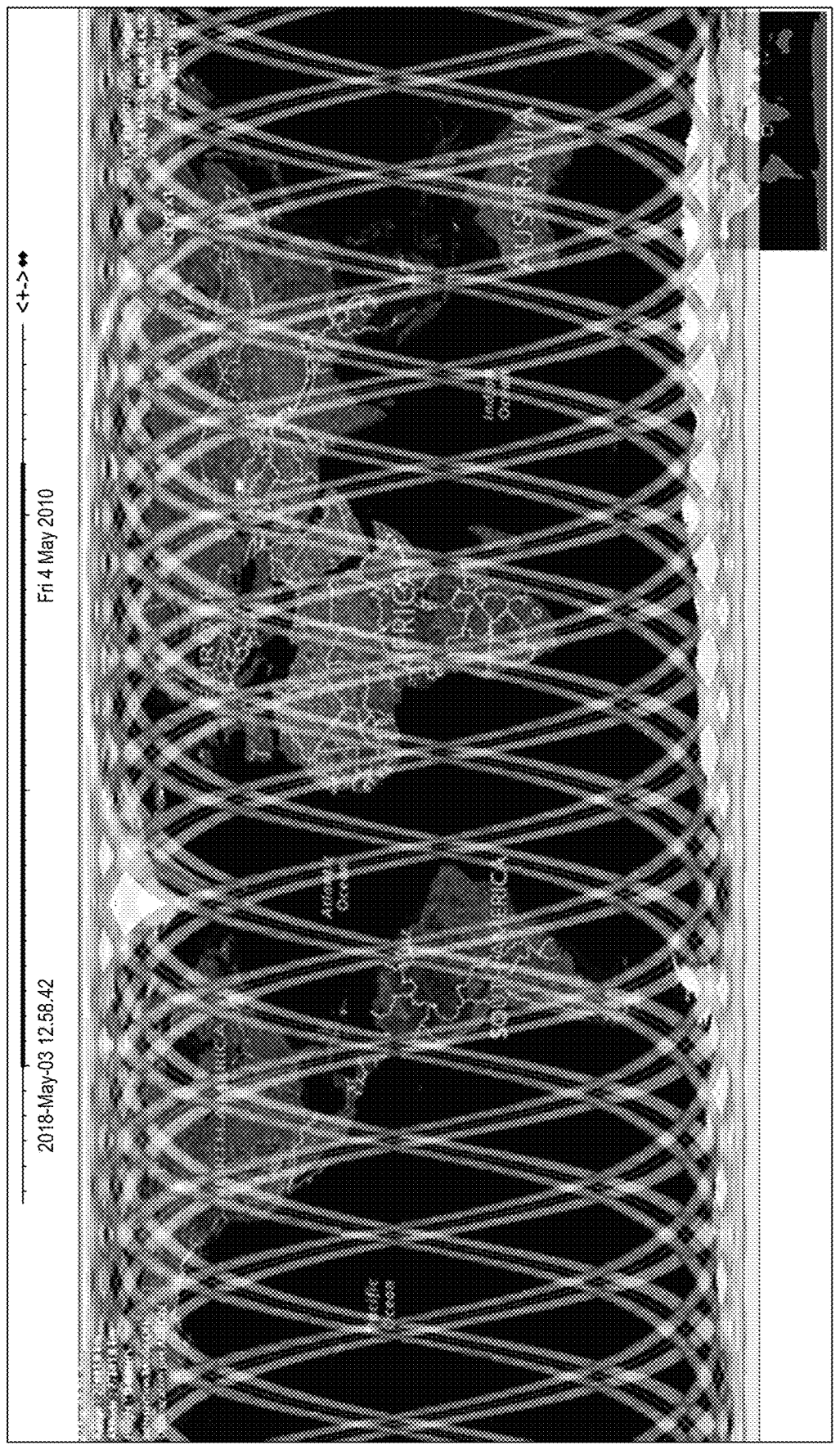
FIG. 2 is a map of the Earth showing the coverage of one satellite in 24 hours.

This can be readily appreciated from the coverage map illustrated in FIG. 2 which shows the coverage on Earth of a satellite path in 24 hours. Well under half the Earth is covered in 24 hours, indicating that it may take several days to provide a complete coverage and for satellite 102 of FIG. 1 to pass directly over location 108 again to acquire the requested image. This scenario can easily contribute around a week in the delay between submitting the new request and delivering the requested image.

In the example of FIG. 1, after eventually passing location 108 for a second time after the request was submitted, satellite 102 will shortly thereafter pass over ground station 110 to downlink the captured image. Once received by ground station 110, the image can be delivered to an end user and/or processed to extract other usable information such as land monitoring parameters for delivery to the end user.

As a result of the time lag of up to a week or more that can occur between request submission and delivery, Earth observation satellites are typically not used for applications that require faster response times such as hours or minutes. Instead, it is typical for Earth observation missions to be predefined before launch to provide specific images of predetermined events or to provide continuous known performance such as regular monitoring of known locations that can be scheduled in advance.

If it is attempted to add an additional task to a pre-existing schedule after launch, the additional task will be subject to the possible delays described above of up to a week, and furthermore it may be necessary to fit the task into gaps in the existing schedule which is likely not only to exacerbate delays but also to result in an inefficient use of overall resources in the mission.

Figure 3:
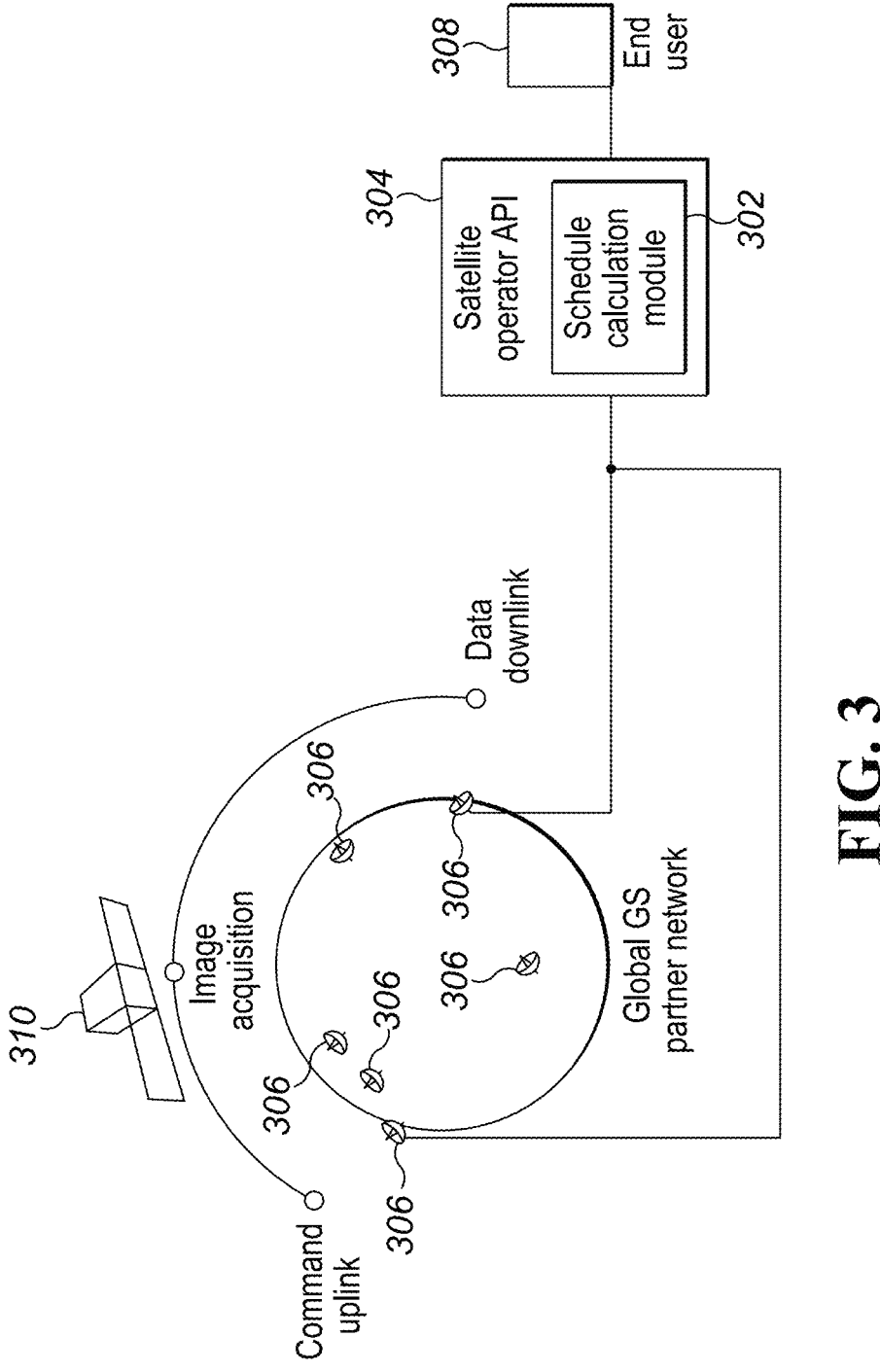
FIG. 3 is a schematic diagram of the Earth, an example satellite, and a system for managing a network of satellites.

Using another approach, it is possible to improve delivery times for new tasks and to use resources more efficiently. Referring to FIG. 3, a system for managing a network of satellites includes a schedule calculation module 302 for calculating a schedule for a network of satellites to execute tasks. Schedule calculation module 302 may be provided in a satellite operator application programming interface (API) 304 that is configured to communicate with a network of ground stations 306 and an end user 308. Ground stations 306 provide uplinks and downlinks to communicate to and from satellite 310 of the set. A representative satellite 310 of the set is shown in FIG. 3. Other satellites of the set are not shown in this figure but the set may include several or more satellites 310, each of which is configured to communicate with ground stations 306.

Schedule calculation module 302 may be comprised in a single computing system or may be distributed across multiple computing systems across multiple locations. For example, schedule calculation module 302 may be located at a ground station, or at another location in communication with multiple ground stations.

By using a network of satellites, for example a network of 18 satellites, the overall coverage of Earth by the set in a given time period is improved. Consequently, the delays caused by waiting for a satellite to pass over a location to be imaged are reduced.

Figure 4:
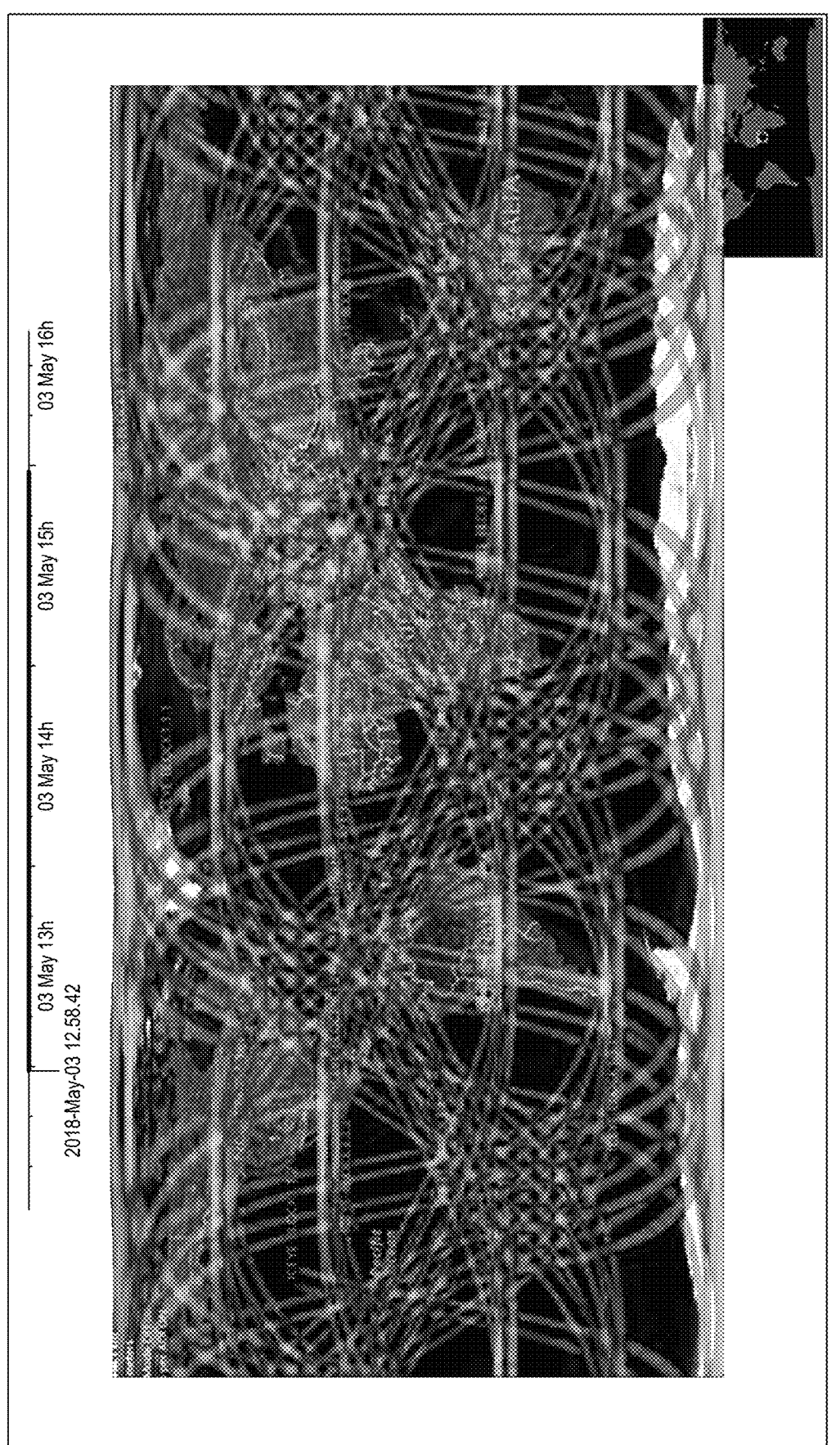
FIG. 4 is a map of the Earth showing the coverage of 18 satellites in 3 hours.
Figure 5:
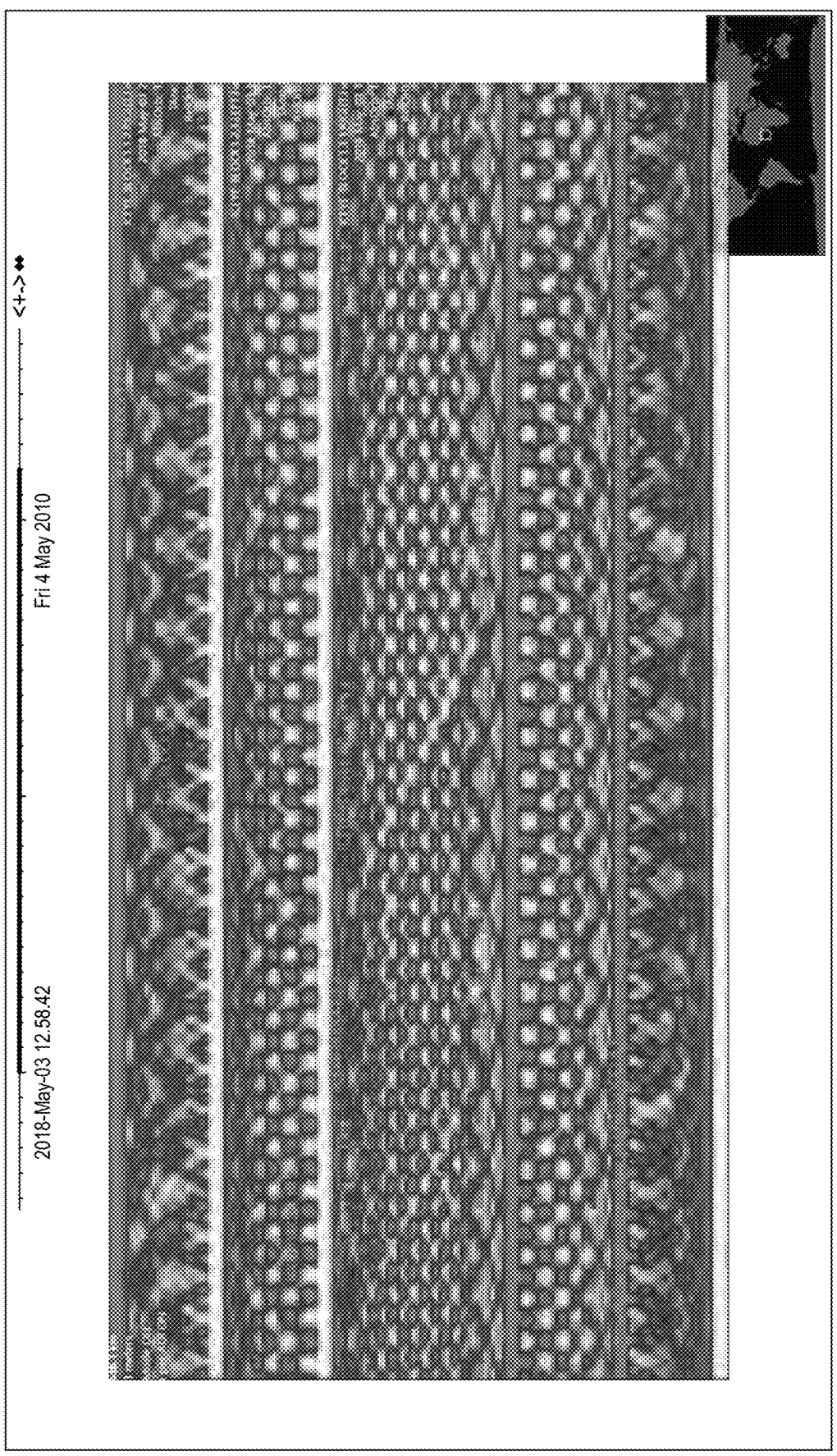
FIG. 5 is a map of the Earth showing the coverage of 18 satellites in 24 hours.

This can be appreciated by referring to the maps shown in FIGS. 4 and 5. FIG. 4 shows a map of the coverage on Earth of 18 satellite paths in 3 hours, and FIG. 5 shows the coverage on Earth of the same 18 satellites in 24 hours. Substantially complete coverage of the Earth is achieved in 24 hours, unlike the situation with a single Earth observation satellite shown in FIG. 2.

The larger the number of satellites in the satellite network, the better the overall coverage of Earth by the satellite network in a given time period (e.g. reduced time between successive images of the same area or feature on Earth). For example, having two or more satellites will already provide significantly increased coverage compared to having only one satellite in the network. Three or more satellites would provide even better coverage, as would five or more satellites, or twelve or more satellites. Eighteen or more satellites as described in this example provide exceptional coverage. Even a satellite network with five or more satellites can achieve repeat times (time between possible successive images of one area or feature on Earth) previously unheard of in Earth monitoring.

However, as the number of satellites in the satellite network increases, the complexity of scheduling, optimizing, and tasking all of the satellites to carry out, post-launch, their assigned tasks increases exponentially. According to embodiments of the disclosure, and in order to efficiently deal with such an ever-increasing demand on the satellite network, schedule calculation module 302 and supporting databases may be used to handle these complex processing and tasking activities.

In particular, schedule calculation module 302 shown in FIG. 3 actively manages the tasking of the launched satellites 310 as new tasks are received. When a new task is received, a schedule of the entire network of satellites is recalculated so that the overall tasking can be kept efficient while incorporating the new task with an acceptable delivery time. This approach may enable turn-around times of a few hours or less for tasks submitted post-launch.

Figure 6:
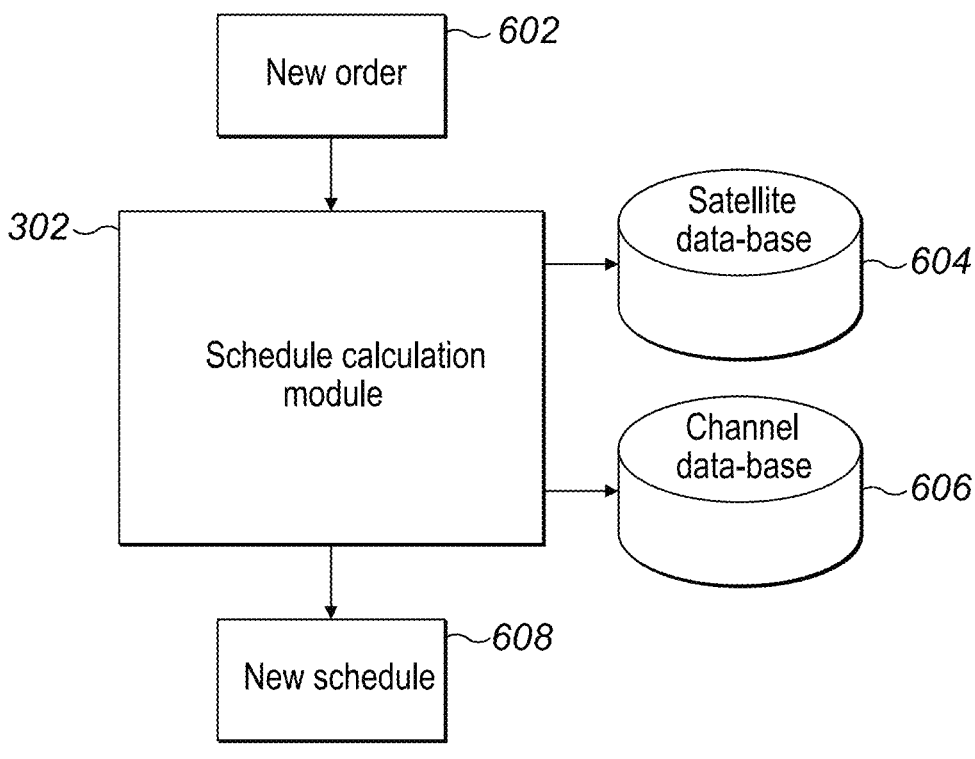
FIG. 6 is a schematic diagram of a schedule calculation module of the above system, a satellite database, and a channel database.

Schedule calculation module 302 is shown in FIG. 6 in relation to a new task or order 602, a satellite database 604, a channel database 606, and a new schedule 608. Schedule calculation module 302, satellite database 604, and channel database 606 may form part of a ground control station or satellite operator API, and together function to calculate a new schedule 608 every time a new order 602 is received. Schedule calculation module 302 is configured to recalculate the schedule using data from satellite database 604 and channel database 606 which store data such as satellite paths, satellite availability, ground station locations and availability, and available communication channels between the satellites and the ground stations. Details of these data and how they are used are described below.

Figure 7:
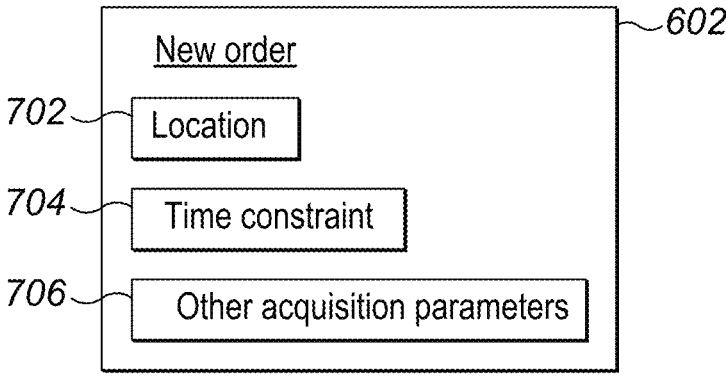
FIG. 7 is a schematic diagram of an order for an image of a location.

Referring to FIG. 7, a new order 602 generally defines one or more geographical locations to be imaged and a time requirement for when the one or more images are to be acquired. The time requirement may, for example, be that the images are required immediately or as soon as possible, or may comprise one or more periods of time in the future during which images should be taken. Typical requests may require that images be taken at regular time intervals, for example daily. Other acquisition parameters may also be stipulated in a given request. For example, a customer may wish to specify the mode of acquisition such as 'spotlight' or 'stripmap'—these give trade-offs between resolution and area coverage (spotlight providing a higher resolution at the expense of smaller area coverage, and stripmap the reverse). This may depend on any desired further processing that the customer would wish to perform with an image (for example, object classification, change detection, etc.). As such, referring to FIG. 7, new order 602 may comprise an indication of a location 702, a time constraint 704, and any other acquisition parameters 706.

Figure 8A:
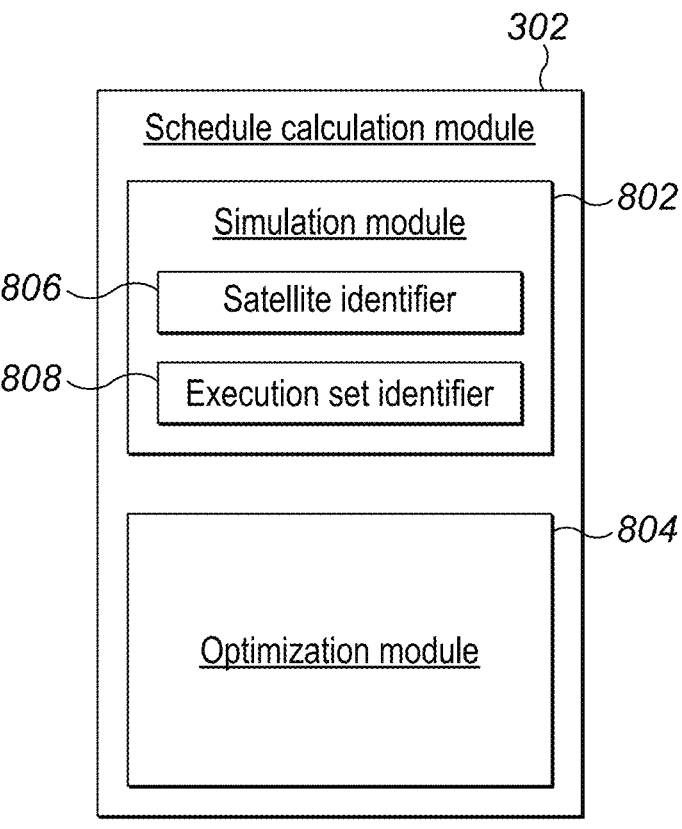
FIG. 8A is a schematic diagram showing details of the above schedule calculation module.

Every time a new order 602 is received, schedule calculation module 302 calculates an updated schedule for the satellites that includes imaging the one or more locations defined in new order 602. In order to achieve this, schedule calculation module may comprise, as shown in FIG. 8A, a simulation module 802 configured to determine options for how the schedule can be updated to accommodate new order 602, and an optimisation module 804 configured to determine a suitable updated schedule based on the available options.

Simulation module 802 comprises a satellite identifier 806 configured to identify satellites that, based on their orbital positions and projected paths, can acquire the requested images. The requested images include the ones that have been requested in new order 602 as well as the ones that have been requested in previous orders and have not yet been acquired. The satellites that can acquire the images are those whose paths take them over the requested locations in accordance with the time constraints specified in the requests.

In order to identify which satellites can execute which requests, satellite identifier 806 may be configured to execute a simulation of the satellite paths to determine which satellites will next be passing over the relevant geographical locations. It will be appreciated that an arbitrary acquisition may not be executed perfectly, and that satellite identifier 806 is therefore looking for satellites that would be able to match an arbitrary request to a location within a reasonable threshold of the specified time constraints while also maintaining the other acquisition parameters as well as possible.

Referring to FIG. 8B, satellite identifier 806 may generate a table of acquisition opportunities for acquiring an image of a location such as Tokyo. In a first example scenario, there is one imaging satellite and satellite identifier 806 generates a first table 810 detailing the possible opportunities to acquire an image of Tokyo using the one satellite during a three-day period. In a second example scenario, there are eighteen satellites and satellite identifier 806 generates a second table 812 detailing the possible opportunities to acquire an image of Tokyo using one or more of the eighteen satellites during a three-day period.

As shown, first table 810 has two rows, each representing an opportunity to acquire an image of Tokyo during the three days. There are two opportunities because, although there is only one satellite, it passes over Tokyo twice during the three days. Details of each acquisition opportunity are provided in the respective rows of table 810. In a first column 'Anx' 814, a coordinated universal time, also known as a universal time coordinated and abbreviated as UTC, is indicated. This provides a timestamp of the acquisition showing the date and time the image would be acquired. A second column 'AreaCovered' 816 indicates the percentage of the requested area that would be imaged in that acquisition. In a third column 'Duration' 818, a duration in seconds is indicated showing how long the satellite's imaging instrument would be activated in order to capture the image. This is ten seconds in this example. A fourth column 'End' 820 indicates the date and time when the imaging instrument would complete the imaging—the end of the ten-second period. In a fifth column 'IntersectionArea' 822, the overlap in square kilometres between the requested area to be imaged and the actual area that would be imaged is indicated. A sixth column 'Length' 824 indicates the distance as projected onto the ground that the satellite would cover during the ten-second imaging operation. In a seventh column 'LookAngle' 826, a tilt of the imaging instrument or the entire satellite on a roll axis is indicated in degrees. An eighth column 'Pass' 828 indicates whether the imaging satellite would be travelling towards the north pole (ascending) or towards the south pole (descending) as projected onto the Earth's surface when the imaging would take place. In a ninth column 'Satellite' 830, the identity of the satellite is indicated. In the scenario of table 810, there is only one satellite and so both rows indicate the same satellite. Finally, a tenth column 'Sensor' 832 indicates whether the satellite is looking to the left or the right, as defined relative to its direction of travel, for example in the case of a SAR satellite. This can be done with separate instruments, or it can be done by rotating the entire satellite to aim the imaging apparatus or the SAR antenna to the left or right side.

The table 812 relating to the second example scenario has similar columns and shows acquisition opportunities using one or more of eighteen satellites in a 3-day period. There are fifteen rows, representing fifteen acquisition opportunities during the three days. As shown in the ninth column 'Satellite', some rows indicate the same satellite, showing that some satellites pass over Tokyo more than once during the three days. For example, the second and third rows both relate to image acquisition by the satellite 'SAT-BLOCK1.2.2'. In total, in the three days, ten of the eighteen satellites pass over Tokyo once or more, providing the fifteen acquisition opportunities shown in table 812.

Returning to FIG. 8A, simulation module 802 also comprises an execution set identifier 808 configured to identify ground stations to complete the request. Ground stations are required to uplink new schedules to the satellites and to downlink image data or data derived from the images from the satellites. Thus, for each image to be acquired, execution set identifier 808 is configured to identify one or more execution sets, each execution set comprising a satellite, a ground station that can provide an uplink, and a ground station that can provide a downlink. By identifying the execution sets, simulation module 802 generates a set of options of how the requests can be executed. For example, in the case of table 810 of FIG. 8B, each row representing a potential acquisition may be associated with five ground stations providing uplink options in the 90 minutes before acquisition and five ground stations providing downlink options in the 90 minutes after acquisition. As a result, for each possible acquisition (i.e. for each row in the table 810), there may be 5×5=25 execution sets. Since there are two potential acquisitions, there could be 2×25=50 possible execution sets to acquire an image of Tokyo in this scenario. In general, a suitable execution set for each image to be acquired needs to be selected from among the available options. For example, a suitable selection of execution sets may provide efficient use of resources across the satellites and ground stations, and may also result in execution of the new request within an acceptable delivery time.

In order to make a suitable selection of execution sets, schedule calculation module 302 comprises an optimisation module 804 configured to determine an optimised set of execution sets. Optimisation module 804 attempts to match the requests to the execution capabilities that are available, and may be configured to optimise for delivery time, efficient use of satellite and ground station resources, and cost-effectiveness. Details of optimisation module 804 are described in further detail below, with reference to FIGS. 15-18.

Figure 9:
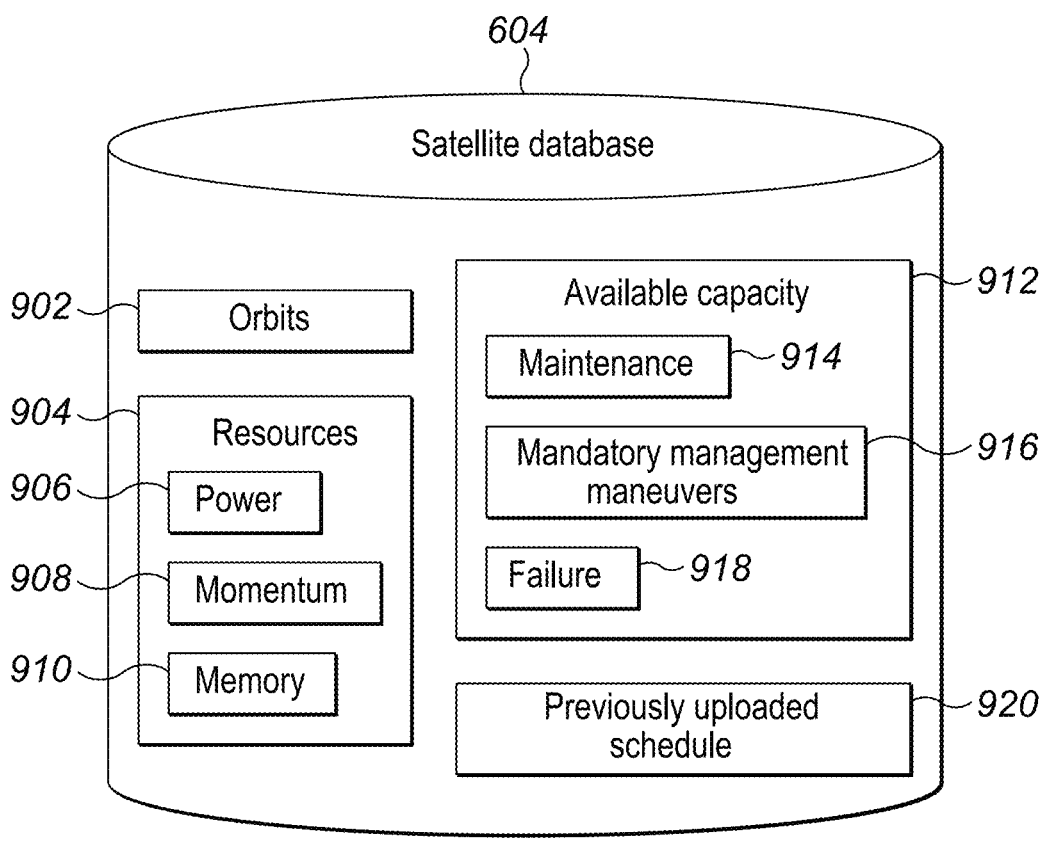
FIG. 9 is a schematic diagram showing details of the above satellite database.

In order to identify satellites and execution sets, simulation module 802 is communicatively connected to a satellite database 604 and a channel database 606. As shown in FIG. 9, satellite database 604 stores satellite data such as satellite orbits 902, satellite resources 904 such as power 906, momentum 908 and memory 910, available capacity 912 including data on reductions in capacity due to satellite maintenance 914, satellite mandatory management manoeuvres 916 and satellite failures 918, and a previously uploaded schedule 920. In examples, satellite database 604, or another database that schedule calculation module 302 has access to, may store business rules that may also be used to determine a new schedule.

Figure 10:
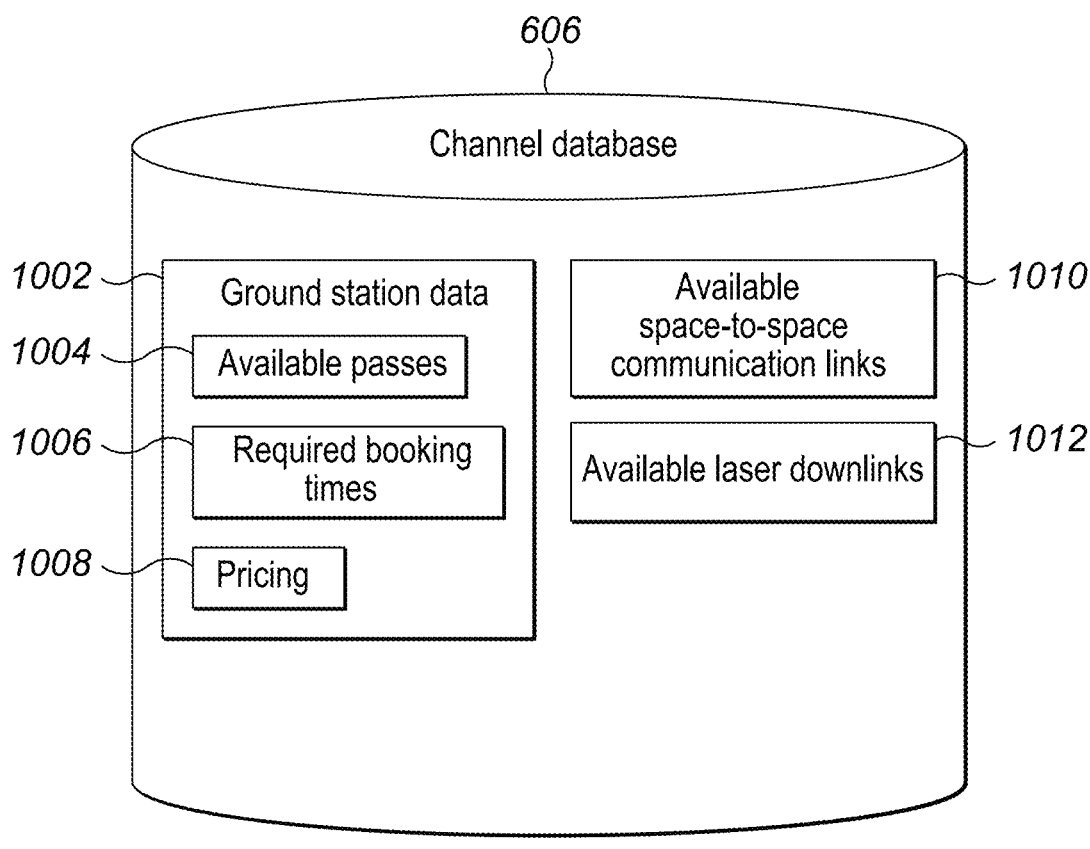
FIG. 10 is a schematic diagram showing details of the above channel database.

As shown in FIG. 10, channel database 606 stores channel data (relating to communication channels to and from satellites) such as ground station data 1002 including available passes 1004, for example passes when the ground station has capacity to up/downlink or some other measure of availability, required booking times 1006, for example minimum time between booking the ground station and up/downlinking or some other measure of booking time, and pricing 1008, available space-to-space communication links 1010, and available laser downlinks 1012. Space-to-space communication links 1010 may be provided by other satellites such as geostationary satellites or other spacecraft.

Simulation module 802 of schedule calculation module 302 uses data in satellite database 604 and channel database 606 to determine the execution sets that can be used to acquire images.

Figure 11:
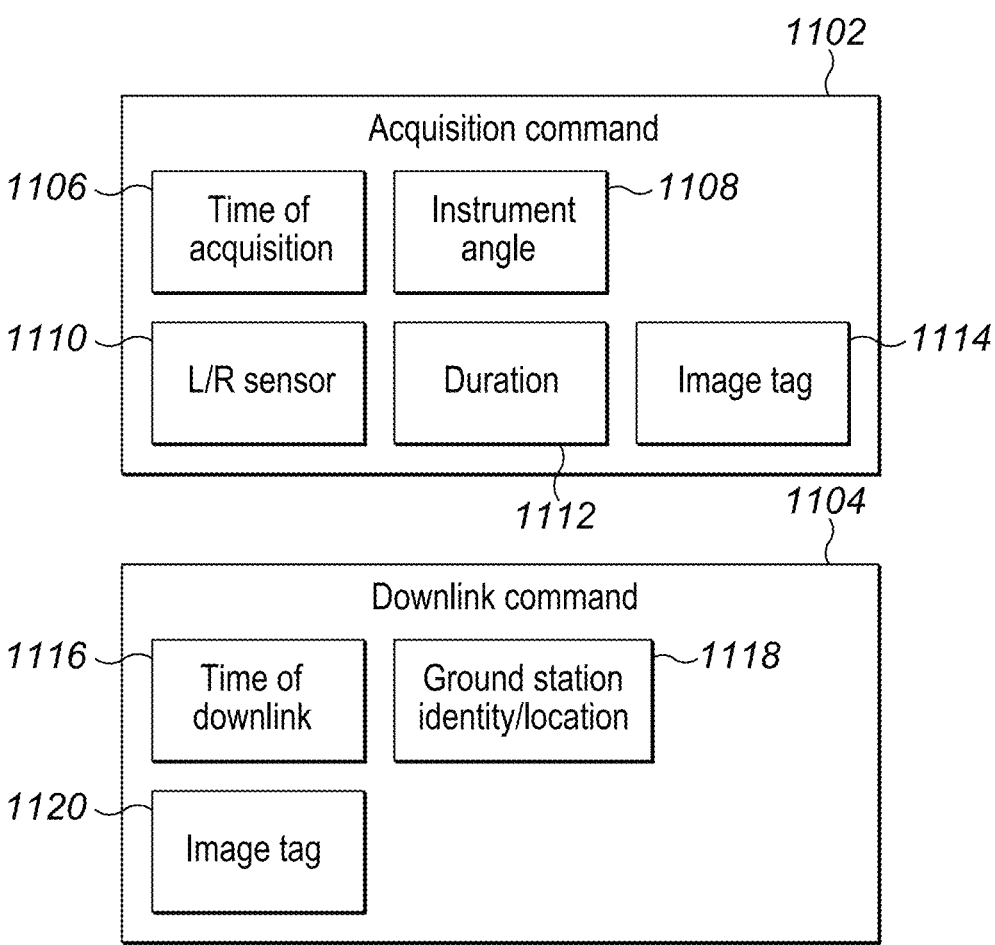
FIG. 11 is a schematic diagram showing schedule information to be uploaded to a network of satellites.

Referring to FIG. 11, when a schedule has been calculated, schedule information is uploaded to the set of satellites to instruct them to acquire and downlink image data. In an embodiment, the schedule information comprises an acquisition command 1102 providing details of when and how to perform the imaging operation, and a downlink command 1104 comprising details of when and how to downlink the acquired data. There is no uplink command because it will be appreciated that the satellite is configured to receive an uplinked signal without being commanded to do so.

Acquisition command 1102 may comprise an indication 1106 of the time the image is to be acquired, an indication 1108 of the angle of the imaging instrument on a roll axis, an indication 1110 of whether a left or right sensor is to be used for the imaging, an indication of a duration 1112 of the imaging operation (for example, ten seconds as in the example above), and an indication 1114 of an image tag. An image tag provides an identifier such as a name or alpha-numerical identifier for the image so that it can be identified easily when it is to be downlinked.

Downlink command 1104 may comprise an indication 1116 of the time of the downlink, an indication 1118 of the identity or location of the ground station to which the image is to be downlinked, and an indication 1120 of the image tag. This facilitates the process of identifying the correct image at the scheduled time of the downlink.

Figure 12:
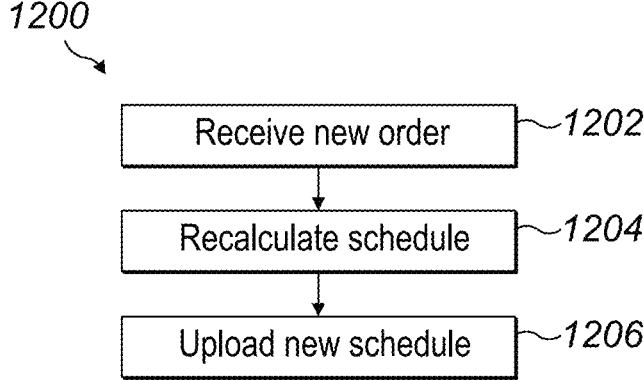
FIG. 12 is a flow diagram showing a method of generating updated schedules for a network of satellites.

Referring to FIG. 12, a method 1200 of assigning tasks to a network of satellites comprises receiving 1202 a new order, recalculating 1204 a schedule 1204, and uploading 1206 the new schedule to the satellites. Method 1200 may be suitably performed by a combination of a satellite operator API and a ground station providing an uplink to a satellite.

Figure 13:
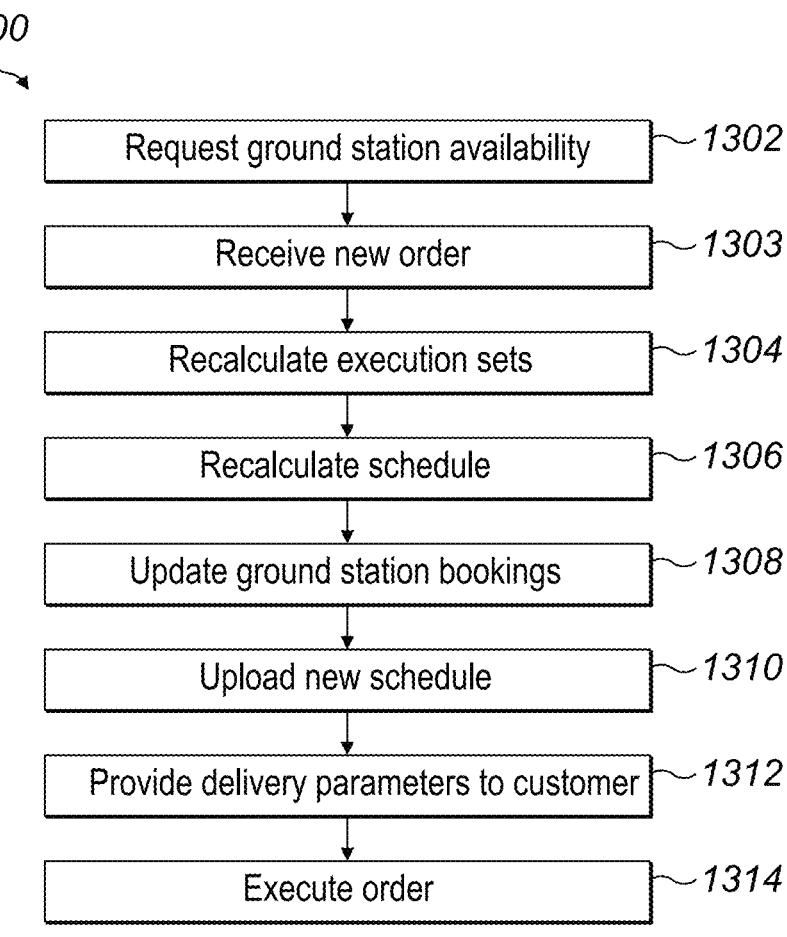
FIG. 13 is a flow diagram showing an example implementation of the above method of generating updated schedules for a network of satellites.

FIG. 13 shows a worked example 1300 of how a satellite operator can manage a constellation of satellites using the apparatus of FIGS. 6, 8, 9 and 10. In order to recalculate the schedule of satellite tasks each time a new order is submitted, schedule calculation module 302 may require up-to-date information on available resources. These include data on the satellites and data on the ground stations so that execution sets can be identified and selected from. As such, the data stored in satellite database 604 and channel database 606 are kept up-to-date. Satellite data, such as orbits 902, power 906, and momentum 908 are within the satellite operator's control and known to the satellite operator. As a result, this data can be kept up-to-date by the satellite operator without any reliance on external providers. However, if the satellite operator uses an external ground station provider, then ground station data 1002 stored in channel database 606 has to be regularly sourced from the ground station provider to keep this information up-to-date. As such, the worked example includes the step of requesting 1302 ground station availability from a ground station provider.

Schedule calculation module 302 receives a new order 602 at step 1303.

At this stage, ways in which the pending orders can be executed need to be identified. The pending orders comprise both the new order and any previously received orders that are still to be executed. In the case that there are no previous orders waiting to be executed, the schedule recalculation step is the same and simply comprises calculating a new schedule. Each order may contain the same parameters and resource allocation. In order to identify possible ways to execute the pending orders, schedule calculation module 302 recalculates possible execution sets for each order at step 1304. This creates options from which a new execution set for each pending order can be selected. The schedule is then recalculated at step 1306 by selecting a suitable execution set for each order and generating a new schedule for the satellites on the basis of the selected execution sets. Execution sets may be selected on the basis of meeting optimisation goals such as minimising delivery time, minimising a difference between a requested image acquisition time and an actual image acquisition time, maximising efficiency of use of resources across the satellites, and minimising cost. A table of resource allocation may be updated at this stage. The resource allocation table may contain information relevant to a particular implementation and may include any one or more of:

Which satellite would be performing the order;

Storage available on the satellite for imaging tasks;

The amount of time a satellite is imaging (executing orders) in a particular orbit (this being limited by power availability (battery capacity) and thermal parameters); and Which downlink pass over a ground station would be used to transfer the image.

In order to implement the new schedule, ground station bookings are updated at step 1308 to match the new execution sets and provide the uplinks and downlinks that are required by the new schedule. This may involve requesting new bookings and cancelling redundant ones, and may require communicating with the ground station provider to change the booking. The new schedule is uploaded to the satellites at step 1310, or at least to affected satellites that are tasked differently in the new schedule compared to the old schedule. The uploading is implemented using ground stations reserved in the updated ground station booking. At this stage, the ground stations and satellites are ready to execute the orders according to the new schedule, and the delivery parameters can be provided at step 1312 to the customer. Delivery parameters may comprise any one or more of: time of image acquisition; time of delivery; where the image will be sent to, such as the address of the customer's Secure File Transfer Protocol (SFTP) server, or if they will access it from services of the constellation operator; what level of processing the customer requires, e.g. Ground Range Detected (the image is registered to the globe)/Single Look Complex whereby the actual I/Q values of the reflected signal are supplied.

At step 1314 the new order is executed, involving acquiring the required image or images and downlinking the image data or suitable data derived from the images for delivery to the customer.

The schedule is recalculated every time a new order is received or another event that affects capacity to execute orders takes place. For example, events that would affect capacity to execute orders may include maintenance of a satellite or ground station, or failure of a satellite or ground station.

The present disclosure provides various advantages for assigning tasks to a network of satellites. From the point of view of the customer who submits a task, there is an improved turn-around time between submitting a task and receiving a requested satellite image. This means that urgent images can be acquired and delivered faster than using traditional methods. From the point of view of the satellite operator, since the schedule is recalculated each time a new task is received, the available satellites and their resources can be used more efficiently and more cost-effectively when new tasks arrive.

Some embodiments enable satellites with different capabilities to be easily accommodated, and a new schedule can be calculated to provide efficient use of satellite resources, taking into account the different capabilities of different satellites. Two main reasons for satellites having different capabilities include simple evolution, as satellites launched more recently will typically be 'better' with more storage, will have been made according to more robust manufacturing techniques, will have more sophisticated radios for both downlink and imaging, will have more accurate pointing systems, etc. Secondly, degradation in space—satellites are prone to high levels of solar/cosmic radiation which can damage subsystems which in turn can then limit their abilities to function. The distribution and timing of this across a network or constellation is effectively random. Further, different satellites may have different imaging capabilities, such as resolution capability, may use different wavelengths for imaging, or may have better processing and storage capability.

Ground stations and their resources may also be used more efficiently. The present approach is also less susceptible to failure because, in the event an asset such as a satellite or a ground station fails, the schedule may be recalculated and the pending tasks may be accommodated as efficiently as possible using the remaining assets and their resources. This is preferable to a failure of a satellite or ground station resulting in tasks not being able to be executed.

Turning now to FIGS. 15-18, there are described further embodiments of assigning tasks to a network of satellites. The methods described in these embodiments may be implemented using, for example, schedule calculation module 302 described above.

Figure 15:
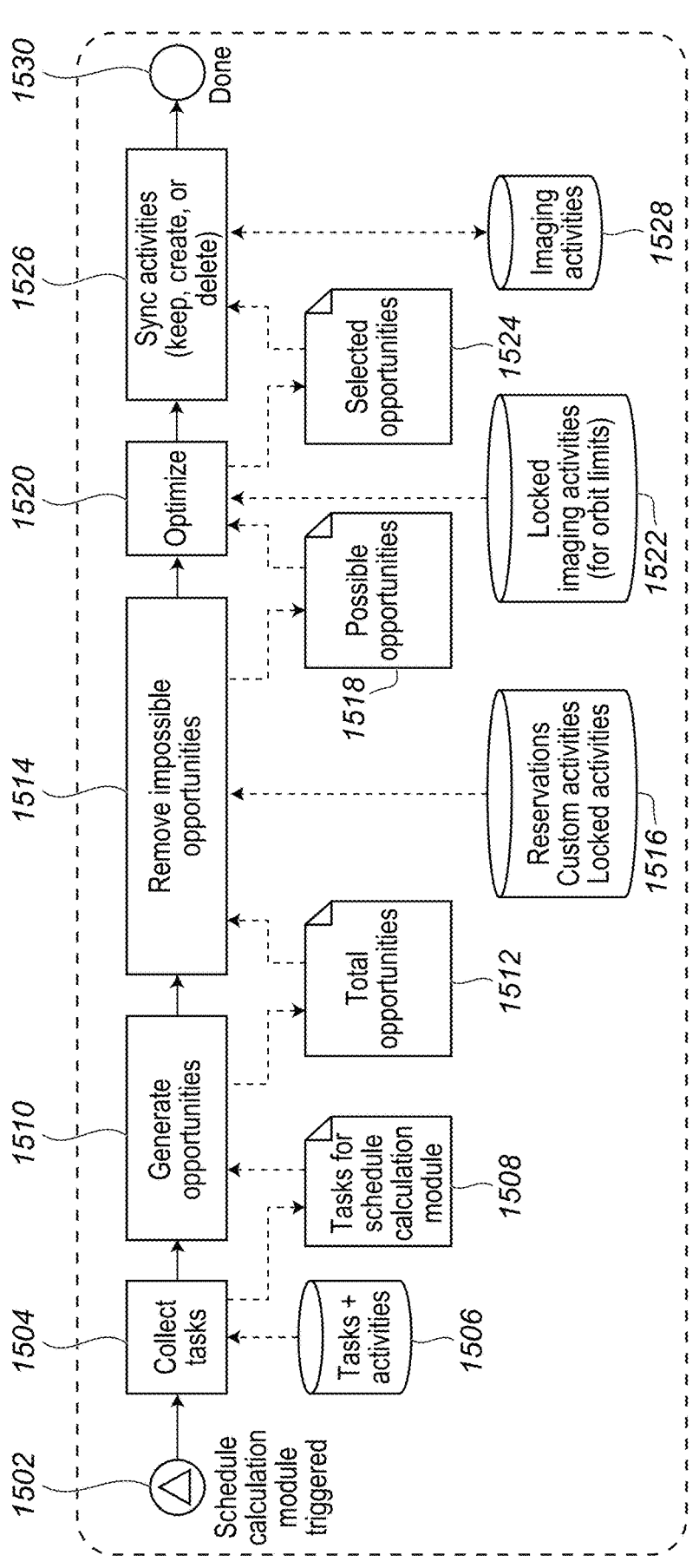
FIG. 15 is a flow diagram of a method of assigning tasks to a network of satellites, according to an embodiment of the disclosure.

FIG. 15 is a flow diagram of a general method assigning tasks to a network of satellites.

At block 1502, schedule calculation module 302 is triggered. According to some embodiments, schedule calculation module 302 is automatically triggered according to one of two ways:

1. Periodically, according to a pre-set periodicity (such as every hour); and

2. Whenever a task's state is set "Active" (i.e. the task has been received and is ready to be acted upon).

Figure 16:
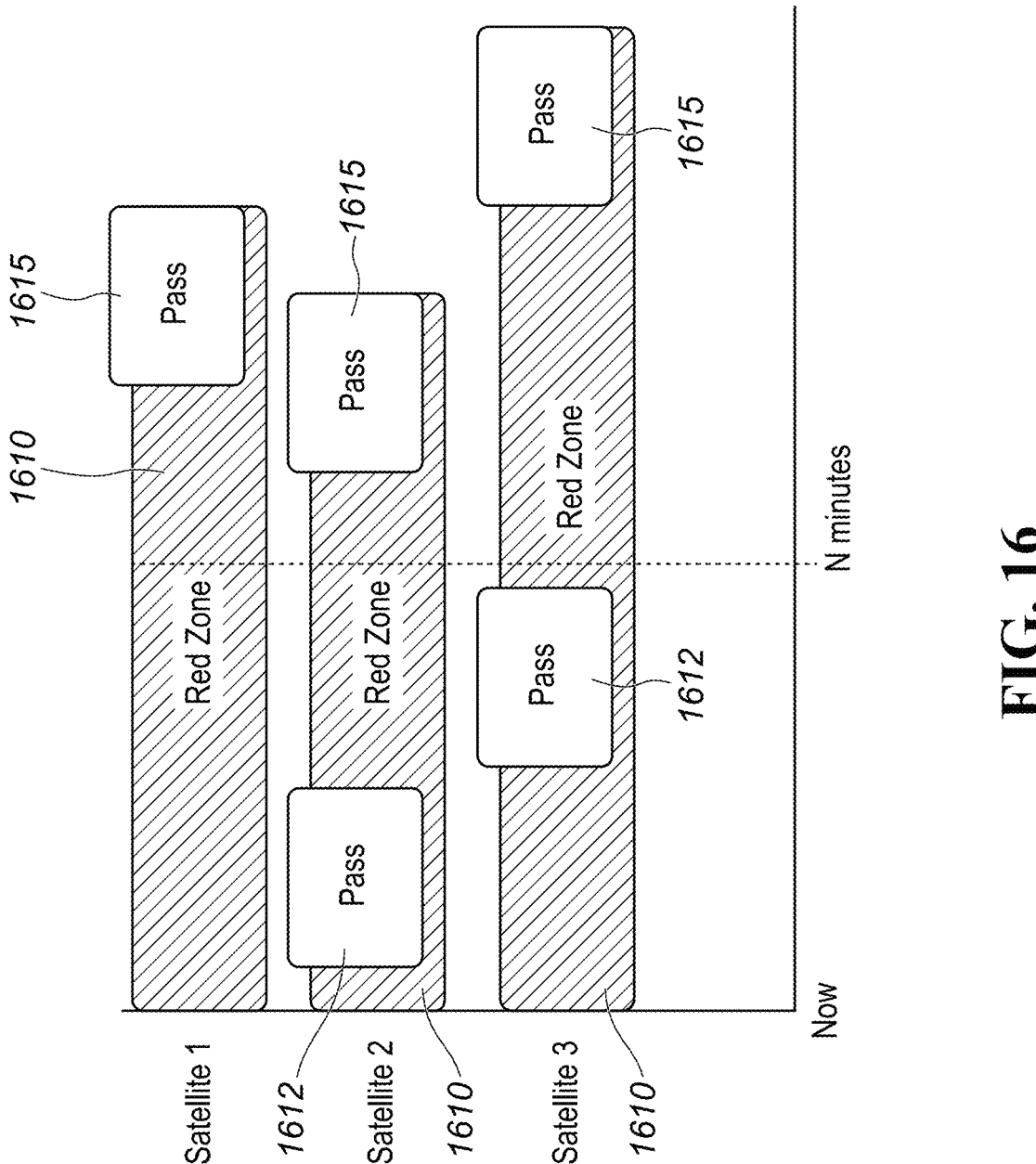
FIG. 16 shows different red zones for different satellites, based on estimated passes for each satellite, according to an embodiment of the disclosure.

As can be seen in FIG. 16, for each satellite, a "red zone" 1610 extends from the current point in time ("Now") to a pre-set, future point in time referred to as "N minutes" (N minutes from Now). "N minutes" is configurable and is based, for example, on the amount of time schedule calculation module 302 needs in order to perform its optimization. This period of time therefore represents a period of time during which there is insufficient time to optimize any tasks/activities that have already been scheduled for execution between Now and N minutes. Note that, for satellites 2 and 3, red zones 1610 extending between Now and N minutes encompass passes 1612. A pass corresponds to the satellite passing over a ground station and therefore being in a position to receive new scheduling instructions from the ground station.

Beyond N minutes, red zones 1610 extend to the end of the next pass 1615 that has been booked for the satellite in question. This period of time represents a period of time during which new scheduling instructions cannot be sent to the satellite until the satellite has completed its next pass over a ground station. Therefore, during this period of time, even if schedule calculation module 302 has completed its optimization, any new tasks/activities cannot be scheduled on the satellite until the satellite has completed its next pass.

Therefore, generally speaking, any tasks and/or activities scheduled to take place during a redzone 1610 may be considered "locked" and therefore are not taken into consideration by schedule calculation module 302 during its optimization process, as described in further detail below.

Once schedule calculation module 302 is activated, as described above, schedule calculation module 302 fetches any task that meets the following criteria:

The task is in "active" state.

The time window associated with the task (i.e. the time period during which the task must be completed) is not wholly located within each satellite's red zone 1610.

There are no active image acquisition activities associated with the task that were not generated by schedule calculation module 302. For example, if the task is associated with one or more manually-entered image acquisition activities, then schedule calculation module 302 ignores the task.

The task does not include any active image acquisition activities that are scheduled to occur before the run window of schedule calculation module 302. For example, referring to FIG. 16, schedule calculation module 302 will not fetch any task with an active image acquisition activity set to occur between "Now" and "N minutes", as well as between "N minutes" and the end of the next pass booked for a satellite, since such image acquisition activities are locked and are not modifiable by schedule calculation module 302.

At block 1504, schedule calculation module 302 collects one or more tasks that have been received (for example, from customers of the satellite network operator) and that have not yet been assigned to a satellite. For example, schedule calculation module 302 may access and retrieve tasks and activities that have been received and that are being stored in a database 1506. As described in further detail below, each task may be associated with one or more activities which may be generated in response to the scheduling of a task. Activities may also be prioritized based on one or more parameters of the task. For example, if a task requires that an image be taken within the next 72 hours, then multiple activities may be generated for the task, with each activity requiring that an attempt be made to capture the image every 24 hours, for example.

At block 1508, schedule calculation module 302 identifies tasks that have been locked (e.g. those that are located within red zones 1610 in FIG. 16) and those that are able to be rescheduled (e.g. those that are located outside of red zones 1610 in FIG. 16). Only those tasks that are still able to be rescheduled are then passed to block 1510 in the process.

At block 1510, based on the tasks that have been collected by schedule calculation module 302, schedule calculation module 302 identifies one or more opportunities. As described above, an opportunity represents a given satellite of the network potentially executing the task (e.g. in the case of image acquisition, potentially capturing the desired image or images of the geographical location). Details of how the opportunities are identified are discussed in further detail below.

In an embodiment, for each outstanding task that has been collected by schedule calculation module 302, the most up-to-date opportunities are generated at block 1510. The parameters of some of these opportunities may have only changed a small amount (e.g. based on slight variations in orbits) when compared to corresponding opportunities generated by schedule calculation module 302 during previous runs.

In an alternative embodiment, a separate opportunity generator is run regularly outside of schedule calculation module 302 in order to generate opportunities for all active tasks. For example, it could be scheduled to run every hour, or every time new True Line Elements (TLEs) are received for the satellites. TLEs provide the most up-to-date information about the speed and direction of the satellites, and these updated orbits are taken into account in generating the opportunities, which may vary slightly from previous calculations. Once calculated, these opportunities are put into an opportunity cache, replacing previously calculated opportunities.

In this alternative embodiment that uses opportunity caching, when schedule calculation module 302 is triggered, for example by a new task, only opportunities for the new task need to be generated at block 1510. Opportunities for all other active tasks can be pulled from the opportunity cache. In this manner, significant processing time can be saved in running schedule calculation module 302, which may allow for a more optimum and timely scheduling of tasks.

Regardless of whether opportunities for all tasks are generated at block 1510 or opportunity caching is used for already existing tasks, a set of total opportunities (representing all the identified opportunities) is generated at block 1512 by schedule calculation module 302.

At block 1514, schedule calculation module 302 identifies and removes any opportunity that is deemed impossible. An impossible opportunity may be an opportunity that cannot be performed when account is taken of other pre-scheduled tasks or activities that a given satellite is scheduled to perform. For example, schedule calculation module 302 may determine that a given satellite is in principle capable of executing a task (within the constraints defined by the task) that has been retrieved at block 1504. However, schedule calculation module 302 may also determine that, when the given satellite will be in the position required to execute the task, the satellite has already been scheduled for maintenance work. Schedule calculation module 302 may therefore identify the corresponding opportunity as being an impossible opportunity, and the opportunity is therefore filtered out of the set of total opportunities. The filtering out of impossible opportunities may be based on data retrieved from a database 1516 of reservations, custom activities, and locked activities. Such data may be representative of scheduled tasks and activities that cannot be rescheduled and that may therefore prevent a given opportunity from actually being carried out by the corresponding satellite.

Other constraints that may result in an opportunity from the set of Total Opportunities being filtered out include a satellite being already scheduled to perform a task that was not fetched by schedule calculation module 302 at block 1504 (for example, a task that was generated by the satellite network operator as opposed to being received by a customer of the satellite network operator), as well as any pre-existing custom activities that have been reserved for the satellite and that overlap with the opportunity.

At block 1518, a set of possible opportunities (i.e. the opportunities that remain after filtering out impossible opportunities from the set of total opportunities) is generated by schedule calculation module 302.

At block 1520, as described above, optimization module 804 is used to optimize the various possible opportunities based on one or more constraints. At block 1522, the details of any locked activities (e.g. activities that are located within red zones 1610 in FIG. 16) are provided to optimization module 804 so that optimization module 804 may take into account such locked activities when performing the optimization process.

During the optimization process, a scheduling score (or simply "score) is calculated for each opportunity based on a number of parameters including task priority, opportunity scarcity, how many opportunities are ahead, the availability of future downlinks, and task seniority (these parameters are discussed in further detail below). During each iteration of the optimization process, schedule calculation module 302 is then configured to output a binary result (i.e. either the opportunity is selected, or the opportunity is not selected) and maximize the score. As also described in further detail below, during the optimization process, constraints are set to limit, for example, one opportunity per task, to prevent overlaps between opportunities corresponding the same satellite, and that the orbit limits would be respected given existing, locked imaging. According to some embodiments, linear programming tools, for example the Coin-or branch and cut (CBC) solver and Coin-OR's PuLP library, can be used to solve the optimization problem.

At block 1524, based on the results of the optimization process, optimization module 804 outputs a set of selected opportunities that represent the assignment of each task to a corresponding satellite of the network.

At block 1526, based on the selected opportunities, schedule calculation module 302 then synchronizes with existing activities in database 1528. For example, if an existing activity in database 1528 is sufficiently similar to a selected opportunity (e.g. if both the selected opportunity and the imaging activity correspond to the same satellite and to a task that involves imaging the same or similar AoI at the same or similar (e.g. +/−30 s) point in time), then the activity is kept unchanged and the opportunity may be deleted. Otherwise, schedule calculation module 302 cancels any active imaging activities scheduled for satellites corresponding to the selected opportunities and that would overlap with the constraints defined in the opportunities. Schedule calculation module 302 then generates new activities based on the selected opportunities, and the activities are uplinked to their assigned satellites. When a new activity is created, it may be cross-checked against orbit limits and for any other potential conflicts. For example, schedule calculation module 302 may check to see whether the associated task was cancelled during the optimization process, in which case the activity can be deleted.

At block 1530, the assignment of the received tasks is completed and schedule calculation module 302 awaits being triggered again at block 1502.

Figure 17:
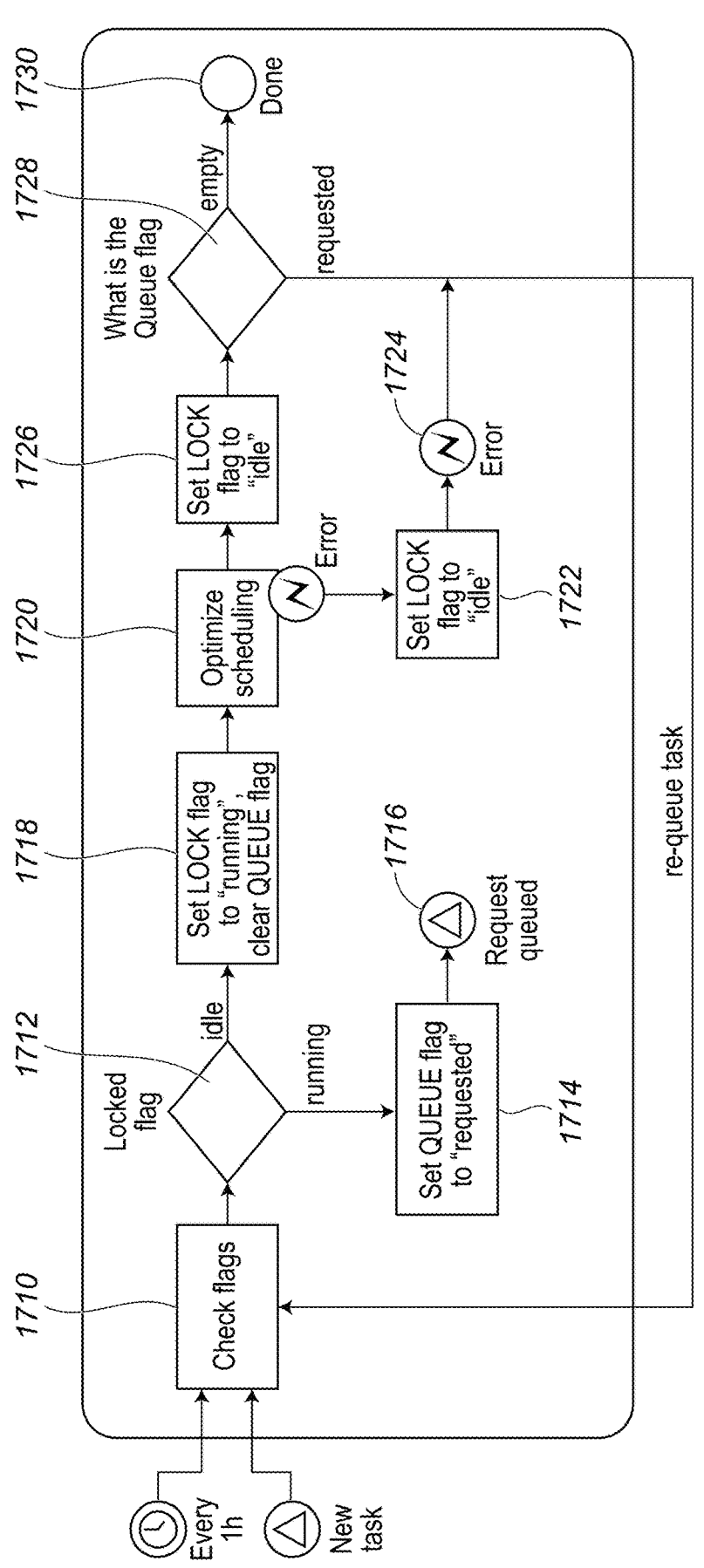
FIG. 17 shows a flow diagram of a method of processing tasks, according to an embodiment of the disclosure.

Turning to FIG. 17, there will now be described an example method of processing tasks. The purpose of the method shown in FIG. 17 is to prevent two or more instances of the optimization process running in parallel. Generally speaking, while schedule calculation module 302 is optimizing a set of tasks, this is achieved by preventing any new tasks that are received in the meantime from being included in the optimization. The method in FIG. 17 may be executed periodically (for example every hour) and in response to a new task received.

Starting at block 1710, the states of a LOCK flag and a QUEUE flag are checked.

At block 1712, the status of the LOCK flag is determined to be either locked (i.e. schedule calculation module 302 is currently running) or unlocked (i.e. schedule calculation module 302 is currently idle).

If the status of the LOCK flag is determined to be locked, then for the time being any queued tasks cannot be processed.

Therefore, at block 1714, the QUEUE flag is set to "requested", and at block 1716 any newly received task is queued.

If the status of the LOCK flag is determined to be unlocked, then schedule calculation module 302 is available to process any queued tasks.

Therefore, at block 1718, the LOCK flag is set to "running", the QUEUE flag is cleared, and at block 120 any queued tasks are fetched by schedule calculation module 302 and are processed in the manner described in more detail below.

At block 1722, if an error occurs during the processing of the tasks, then the LOCK flag is set to "idle", and at block 1724 the process returns to block 1710.

At block 1728, the status of the QUEUE flag is determined.

If the QUEUE flag indicates that there are other tasks in the queue, then the process returns to block 1710.

If the QUEUE flag indicates that there are no other tasks in the queue, then at block 1730 the process ends.

The functionality of optimization module 804 will now be described in more detail.

During the optimization process, and at the end of each iteration of the process, the decision of optimization module 804 to keep one opportunity and not another opportunity is based on the resolution of the optimization problem. Solving the optimization problem relies on identifying the maximum or minimum of a function. Optimization module 804 assigns each opportunity a score or heuristic based on a number of different factors. This initial score is then updated during the optimization process. Once the optimization problem has been solved, the resulting scores rank the various opportunities. According to some embodiments, the optimization problem is configured such that the aim is to obtain the highest "total score" which is the sum of the score assigned to each opportunity input to optimization module 804.

In the following:

"opps_ids" is a list of the IDs of the opportunities input to optimization module 804;

"score" is a vector mapping an opportunity to its scheduling_score; and

"opps_chosen" is a vector of variables that can be 0 or 1:
  opps_chosen[id] set to 1 means that the opportunity corresponding to [id] has been chosen; and
  opps_chosen[id] set to 0 means that the opportunity corresponding to [id] has not been chosen.

The expression of the score is therefore:

$$\text{sum(opps\_chosen[id]*score[id] for id in opps\_ids)}$$

With the optimization problem expressed as such, it is already possible to algorithmically solve the problem via linear optimization. If that was all, then naturally setting opps_chosen[id]=1 for all id in opps_ids is the solution that maximizes the score, meaning that all opportunities would be selected. In theory this would make sense since all tasks want to be executed (e.g. all image acquisition requests want to be competed). However, in practice a number of constraints make this impossible. These constrains need to be converted into mathematical expressions in order to properly express the optimization problem.

The constraints include the following:

1. Any two images cannot be taken at the same time, and in particular any two acquisitions need to be separated by a minimum amount of time. Two opportunities that are too close in time are said to be "conflicting".
2. The duration of any single image cannot extend beyond a certain maximum duration.
3. In any single orbit of the satellite, a certain maximum number of images can be taken.
4. The total time spent imaging during a given orbit (this will depend on the total number of images that are requested during the orbit).
5. Only one opportunity can be picked for any given task.

Constraint 1

In order to mathematically express a constraint, the expression should be formulated on the components of the vector opps_chosen. Let us assume that i and j are two opportunities that are conflicting. We want optimization module 804 to select only one of them. One way to express this is by using:

$$\text{opps\_chosen}[i]+\text{opps\_chosen}[j]<=1$$

Therefore, opps_chosen[i] and opps_chosen[i] cannot both be equal to 1 since the sum would be 2 and that would violate the constraint. In this case, either opportunity, or neither opportunity, is selected (but not both).

Constraint 2

Let opp_1, opp_2, . . . opp_n be the opportunities that can fulfill a given task. The constraint can be expressed as:

$$\text{sum(opps\_chosen[opp\_}i] \text{ for } i \text{ in[|1 } \ldots n|])<=1$$

This constraint needs to be used for every task considered by optimization module 804.

Constraint 3

Introducing Nmax as the maximum number images that can be taken per orbit, let opp_1, opp_2, . . . opp_n be a family of opportunities that are in the same orbit. This gives the constraint:

$$\text{sum(opps\_chosen[opp\_}i]\sim i)<=N\text{max}$$

$$\sim i: \text{for } i \text{ in[|1 } \ldots n|]$$

This needs to be repeated for every orbit of every satellite. Nmax may be different for different satellites.

Constraint 4

For this constraint, instead of using a mathematical expression, it is simplest to remove any opportunity whose imaging duration would be exceeded if it were to execute the task.

Constraint 5

Since the total time spent imaging during a given orbit depends on the total number of images that are requested during the orbit, max_duration is introduced to represent the maximum image duration allowed per number of images. For example, max_duration[3]==95 s means that the maximum total duration for three images taken in one orbit is 95 seconds. For example, 30 s+30 s+30 s would work, while 40 s+30 s+30 s would not. If four images are desired, then the total imaging duration must not exceed max_duration[4], etc.

While one may be inclined to express the constraint as follows, $$\text{sum(duration[opp\_}i]\times\text{opps\_chosen[opp\_}i]\sim i)$$
$$<=\text{max\_duration(sum(opps\_chosen[opp\_}i]\sim i),$$

this is not a valid expression for a basic linear optimization problem, since the right-hand side cannot be a function of the variables.

Another option would be to reformulate the expression in a way that is similar to the previous constraint and to consider all the possible combinations of 1, 2, . . . , Nmax opportunities while adding an additional constraint for that set.

Let k be a number in [|1 . . . Nmax|], and opp_i for i in [|1 . . . k|] be a family of k opportunities in a given orbit (among all the opportunities for that orbit). The constraint would then be:

$$\text{sum(duration[opp\_}i]\times\text{opps\_chosen[opp\_}i] \text{ for } i$$
$$\text{in [|1 } \ldots k|])<=\text{max\_duration}(k)$$

Let's assume that we are considering 10 opportunities and that Nmax is 5. First, all the constraints for all the sets of 2 opportunities that would become images would be added which is 10×9=90 pairs. Then, all the constraints for all the sets of 3 opportunities that would become images would be added which is 10×9×8=720 3-uples. Then, all the constraints for all the sets of 4 opportunities that would become images would be added which is 10×9×8×7=5040 4-uples. Then, all the constraints for all the sets of 5 opportunities that would become images would be added which is 10×9×8×7×6=30240 5-uples.

As one sees, while the number in this example is still relatively low, with Nmax=7 and 20 opportunities an additional 400 million constraints need to be added for that orbit alone. A different approach may therefore be required.

According to a different approach, Nmax constraints are added to each orbit:

$$\text{sum(duration}[opp\_i]\times opps\_chosen[opp\_i]\sim i)$$
$$<=\text{max\_duration}(2)$$

$$\text{sum(duration}[opp\_i]\times opps\_chosen[opp\_i]\sim i)$$
$$<=\text{max\_duration}(3)$$

$$\text{sum(duration}[opp\_i]\times opps\_chosen[opp\_i]\sim i)$$
$$<=\text{max\_duration}(Nmax)$$

An issue here is that the problem may be over-constrained. Ideally, a single constraint should be selected based on a predefined condition.

To do so, an extra set of variables is used. A family of variables (per orbit) is introduced for k in [|1 . . . Nmax|]:

$$\text{is\_equal\_to}[k]=1 \text{ if sum(opps\_chosen}[opp\_i]\sim i)==k$$
$$\text{else } 0$$

Such a family of variables may then be plugged into the constraints above:

$$\text{sum(duration}[opp\_i]\times opps\_chosen[opp\_i]\sim i)$$
$$<=\text{max\_duration}(2)+M\times(1-\text{is\_equal\_to}[2])$$

$$\text{sum(duration}[opp\_i]\times opps\_chosen[opp\_i]\sim i)$$
$$<=\text{max\_duration}(3)+M\times(1-\text{is\_equal\_to}[3])$$

. . .

$$\text{sum(duration}[opp\_i]\times opps\_chosen[opp\_i]\sim i)$$
$$<=\text{max\_duration}(Nmax)+M\times(1-\text{is\_equal\_to}[Nmax])$$

with M being a large number so that if $(1-\text{is\_equal\_to}[k])=1$ then the constraint is essentially useless.

However, this expression is also not linear-optimization compatible.

Therefore, two other families of variables are introduced to replace is_equal_to. For k in [|1 . . . Nmax|]:

$$\text{is\_more\_than}[k]=1 \text{ if sum(opps\_chosen}[opp\_i]\sim i)>=k$$
$$\text{else } 0$$

$$\text{is\_less\_than}[k]=1 \text{ if sum(opps\_chosen}[opp\_i]\sim i)<=k$$
$$\text{else } 0$$

This is also not linear-optimization compatible, but the expression can be converted as follows. For k in [|1 . . . Nmax|]:

$$\text{is\_more\_than}[k]>=(\text{sum(opps\_chosen}[opp\_i]\sim i)-k)/$$
$$Nmax+0.0001$$

$$\text{is\_more\_than}[k]<=(\text{sum(opps\_chosen}[opp\_i]\sim i)-k)/$$
$$Nmax+1.0001$$

Similarly:

$$\text{is\_less\_than}[k]>=(k-\text{sum(opps\_chosen}[opp\_i]\sim i))/$$
$$Nmax+0.0001$$

$$\text{is\_less\_than}[k]<=(k-\text{sum(opps\_chosen}[opp\_i]\sim i))/$$
$$Nmax+1.0001$$

The "0.001" are used to avoid using strict non-equivalence that a linear optimization solver typically has trouble handling.

As can be seen, for Constraint 5, 2*Nmax more variables were introduced, 4*Nmax constraints were introduced for these variables, and Nmax constraints were introduced strictly for expressing the total imaging duration limit per orbit.

As explained above, optimization module 804 assigns a score or heuristic to each opportunity, based on a number of different factors. This initial score is then updated during the optimization process. Once the optimization problem has been solved (based on the above constraints), the resulting scores rank the various opportunities. In short, if two opportunities are in conflict, optimization module 804 will choose the opportunity with the higher score.

According to some embodiments, the score of an opportunity takes into account four parameters, ordered by importance as follows:

1. Task priority. This can be broken down into:
   a. Task tier, which is the number of hundreds in the task priority; i.e. priority 300 and 320 are tier-3 priorities
   b. [find a name], which is the priority stripped from the task tier; i.e. priority 320 is [find a name]20
2. The seniority of a task, or how old the task is. In case the scores for two different opportunities are determined to be equal based on consideration 1 above, then the opportunity associated with the older task (i.e. the task with the greater seniority) will win the tie-break. The task's seniority may be determined using the task ID since IDs are generated based on the order of creation of tasks. In other words, a lower task ID means a higher seniority.
3. The time distance from now until the opportunity, which may be referred to in code as "opps ahead". This score may be used to prioritize one or more opportunities from among a set of opportunities associated with a common task.

The score is based on the above three parameters which are combined to produce a single score. In particular, according to some embodiments, parameter 1 is weighted more heavily than parameter 2 which is weighted more heavily than parameter 3. As an example, a higher score will be generated for an opportunity A for a task having a task priority of 300 and an ID of 100, than for an opportunity B for a task having a task priority of 199 and an ID of 1 (since the task priority for opportunity A is higher than that of opportunity B).

According to some embodiments, each parameter is evaluated and normalized between 0 and 99 and then concatenated. Taking the above example, the scores for opportunities A and B would be generated as follows:

Opportunity A: Tier 3. extra 0. trimmed priority 00. scarcity 10. opps ahead 99. seniority 01→3000109901

Opportunity B: Tier 1. extra 0. trimmed priority 99. scarcity 99. opps ahead 99. seniority 99→1099999999

Since the score of 3000109901 is higher than the score of 1099999999, opportunity A would win in case of a conflict.

The parameters do not necessarily have to be ordered and weighted in the way described above. The parameters can be ordered or weighted differently depending on the situation. For example, if the priority of the network operator is to try to get as many of the tasks completed as possible rather than just ensuring that prioritized tasks are dealt with first, then the seniority of the task may become the most important parameter and will be weighted more heavily as a result.

In some embodiments, other parameters may be included and some of the above parameters excluded from the calculation of the score. In an example, a parameter related to future downlink availability can also be included in the scoring, or can replace one of the existing parameters (e.g., the seniority of the task) in the scoring. In an embodiment, the future downlink availability can comprise how long it takes to downlink the relevant data after the task has been performed.

Often, as in the case of SAR imaging, the task of imaging does not become useful until the raw data is downloaded from the satellite and processed into an image. This can happen on the satellite but more typically this is done on Earth after the data is downlinked. Traditionally, due to the low numbers of SAR satellites in orbit and SAR constellations that only included at most three satellites, repeat times (the amount of time between successive imaging tasks of a particular area of interest) could be on the order of weeks or even months. As such, SAR was used for tasks such as mapping or for looking at changes that occur over a long period of time, and relative to this the time taken to downlink the image was not very important.

More recently, with the advent of larger constellations of SAR satellites, particularly constellations of micro SAR satellites each with a mass of between approximately 100 to 500 kg, satellites are able to return to the same location above the Earth more frequently, for example once per day, once per 12 hours, once per 6 hours, or even more frequently. Such improvements allow for tracking of more dynamic scenes and objects, for which the time between taking the image and the time for downlinking to image data the ground becomes more important. For example, when identifying and locating a moving object such as a ship, downlink availability becomes very important. The longer the time between acquiring the image and downlinking the image to the ground, the less accurate (and hence less valuable) that data becomes. Hence, opportunities with a short duration of time between image acquisition and downlinking the image may be scored more highly, possibly even over images that can be taken sooner but that would have to wait a longer time prior to downlink. Counter-intuitively, a later imaging opportunity may be preferred over an earlier imaging opportunity if a downlink can occur immediately after image acquisition. In these cases, scheduling systems that prioritize opportunities based only on the time distance between now and the opportunity would not arrive at an optimum result. Scheduling systems that take into account future downlink availability can help to solve this problem. In some cases, if the time between acquiring the image and downlinking the image becomes too long, the value of the image may fall to zero and the downlinking may not even occur if there are other higher-scoring opportunities to put in the schedule.

The above describes embodiments using linear programming techniques to optimize the scheduling by formulating the constraints of the satellite problem, and in particular the constraints related to small SAR satellites, in a way that can be used in linear programming.

In another embodiment, a constraint programming or constraint optimization approach can be used instead of linear programming or in combination with linear programming to optimize the schedule for a network of satellites. Constraint programming can be used to identify feasible solutions when there are many possible solutions. In constraint programming, arbitrary constraints can be used and do not necessarily need to be formulated into linear constraints.

Customer Accessible Tasking API

The embodiments described above are fully automatic. In some examples, a user or operator of the system 200 may manually instruct some operations of the method to be carried out. For example, in at least some embodiments a customer accessible "tasking API" may be implemented to allow end users, such as customers ordering satellite imagery, to assign tasks to the constellation of satellites with varying degrees of control and particularity.

In at least some embodiments of the tasking API, an inbound API is made accessible to customers. Through the inbound API, customers may make a request to assign a particular task to the constellation of satellites. The task may comprise, for example, imaging a particular area of interest on Earth. Additionally or alternatively, the task may differ; for example, the task may be to obtain a copy of or link to a previously acquired image of a particular area of interest, or to obtain a current listing of pending tasks. In the context of imaging in particular, the customer's inbound API request comprises at least a time at or during which the task is to be performed by the constellation of satellites.

In response, the schedule calculation module 302, which receives the request, retrieves at least one task performance rule that specifies how the task is to be performed. The retrieval may be performed based on the identity of the customer, which may be conveyed as part of the inbound API request, either explicitly as a parameter of the inbound API request or through identity verification such as based on the IP address of the customer making the inbound API call. Additionally or alternatively, the retrieval may be performed by virtue of a reference to a set of at least one task performance rule that is passed by the customer as a parameter of the inbound API request.

The at least one task performance rule may be pre-agreed between the customer and the operator of the schedule calculation module 302 and may be directed, for example, at any one or more of what types of tasks the customer is allowed to instruct the constellation to perform; in respect of an image acquisition task, a particular region of Earth to be imaged; the priority to be assigned to those tasks relative to other tasks and/or other customers (e.g., for an image acquisition task, a numerical priority ranking such as from 0-100, with higher priority tasks of one customer being performed prior to lower priority tasks from the same and other customers); in respect of an image acquisition task, a default imaging mode used for image acquisition (e.g., "spotlight" or "stripmap", as described above); an expected task completion date and/or time (e.g., for an imaging task, delivery of the consequent image within 1, 3, or 8 hours from the customer placing the request); or for an image acquisition task, whether the resulting image will be private to the customer or publicly available.

With the task performance rule(s) in hand, the schedule calculation module 302 generates at least one internal API call to task the satellite constellation to perform the task, and makes at least one internal API call to thereby assign the task to be performed by the satellite constellation. The at least one internal API call specifies the time at or during which the task is to be performed and ensures the task is done in accordance with the task performance rule(s) and as discussed further below, the satellite operator API 304 may collectively represent at least one internal API, with different internal API(s) collectively callable so as to perform the task requested by the customer. The at least one internal API call made by the schedule calculation module 302 may be accompanied by other internal API call(s) associated with the task to be performed. For example, as a result of the user calling an image acquisition task, the schedule calculation module 302 may also make at least one internal API call to pre-configure an image processing pipeline to process images acquired as a result of performing an image acquisition task. The particular internal API call(s) made to pre-configure the image processing pipeline may be based on the image products (e.g., resolution or imaging mode) specified by a customer when making the inbound API request.

Figure 21:
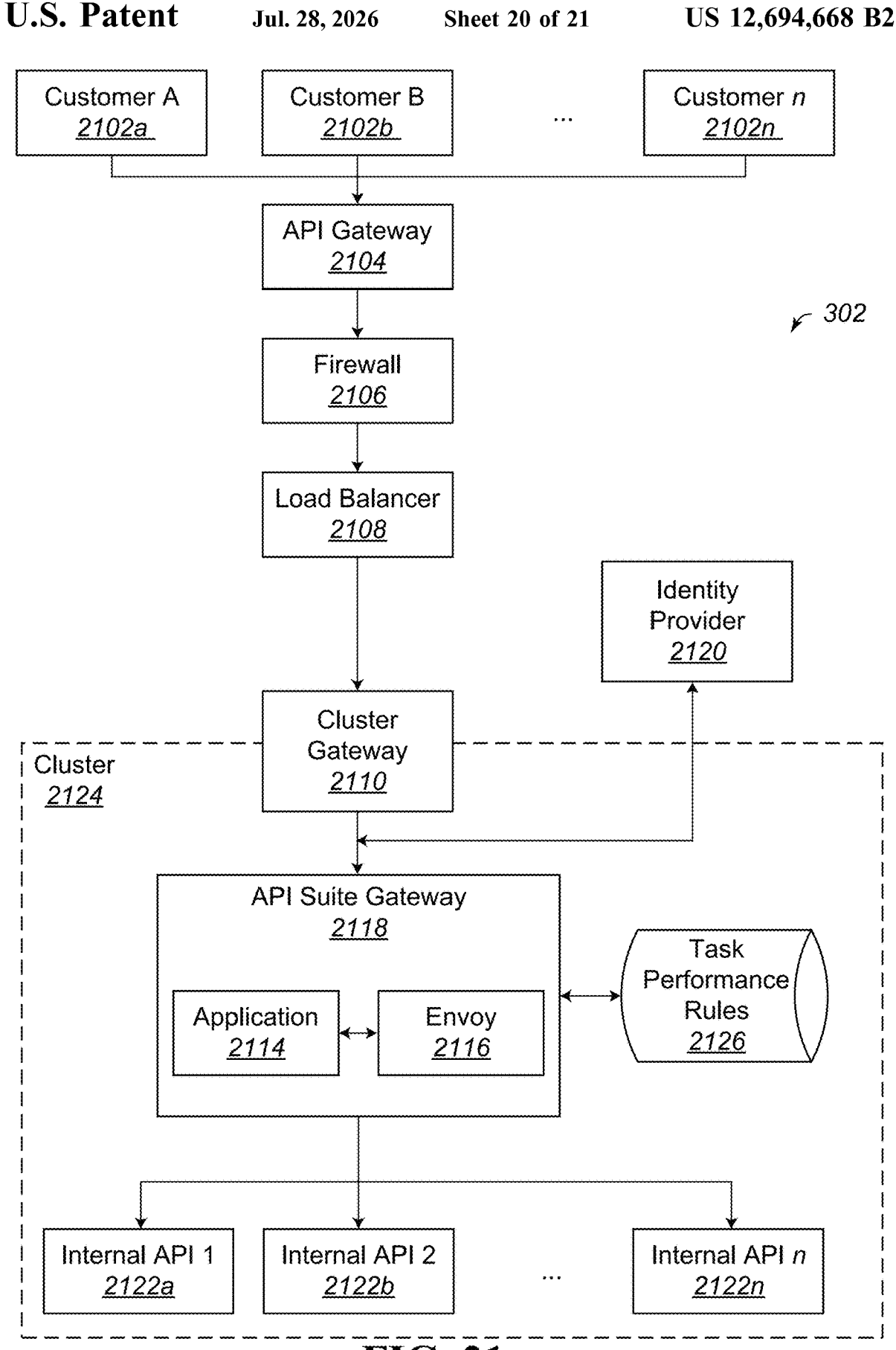
FIG. 21 is a schematic diagram of a schedule calculation module, according to an embodiment of the disclosure.

Referring now to FIG. 21, there is shown the satellite calculation module 302, according to an example embodiment that may be used to implement the customer accessible tasking API. As shown in FIG. 21, first through nth customers 2102*a-n* (generally, "customers 2102") are able to communicate with the satellite calculation module 302 and accordingly assign tasks for performance by the satellite constellation. More particularly, the customers 2102 make the inbound API call via a wide area network such as the Internet and to an API gateway 2104. The API gateway 2104 may comprise, for example, an Amazon™ API gateway. The API gateway 2104 directs traffic to the appropriate system/ network infrastructure, which in FIG. 21 comprises a firewall 2106 followed by a load balancer 2108. The firewall 2106 may comprise an Amazon™ AWS™ Web Application Firewall that applies global security and traffic policies, such as those for denial of service mitigation. The load balancer 2108 directs external traffic as appropriate to various resources comprising the satellite calculation module 302. For example, in FIG. 21 some of the functionality of the satellite calculation module 302 is implemented via containerization, and in particular in FIG. 21 by using Kubernetes™ clusters. As discussed further below, FIG. 21 depicts one such cluster 2124; however, the satellite calculation module 302 may comprise additional analogous clusters (not depicted) that also receive external traffic comprising inbound API call(s) from the load balancer 2108 so as to prevent any single cluster from becoming overloaded.

The depicted cluster 2124 in FIG. 21 receives the external traffic from the load balancer 2108 through a cluster gateway 2110. The cluster gateway 2110 may comprise, for example, an Istio™ gateway. The cluster gateway 2110 routes inbound API traffic to an API suite gateway 2118 used to generate internal API call(s) based on task performance rule(s) 2126 and the inbound API call. This routing may be done, for example, based on the inbound API call's base URL, comprising the API's host, and appended endpoint, comprising the API's path.

The cluster gateway 2110 may also perform other functions. For example, in FIG. 21 it also validates user authentication tokens using an identity provider 2120, which may be based on the OAuth standard. As another example, the cluster gateway 2110 may additionally or alternatively perform user aware rate limiting.

Inbound API calls are received and processed by the API suite gateway 2118, which generates calls for at least one of the first through nth internal APIs 2122*a-n* (generally, "internal APIs 2122") using a combined application 2114 and envoy 2116. A database storing the task performance rule(s) is communicatively coupled to the API suite gateway 2118 for use by the application 2114 in generating the internal API calls.

Figure 22:
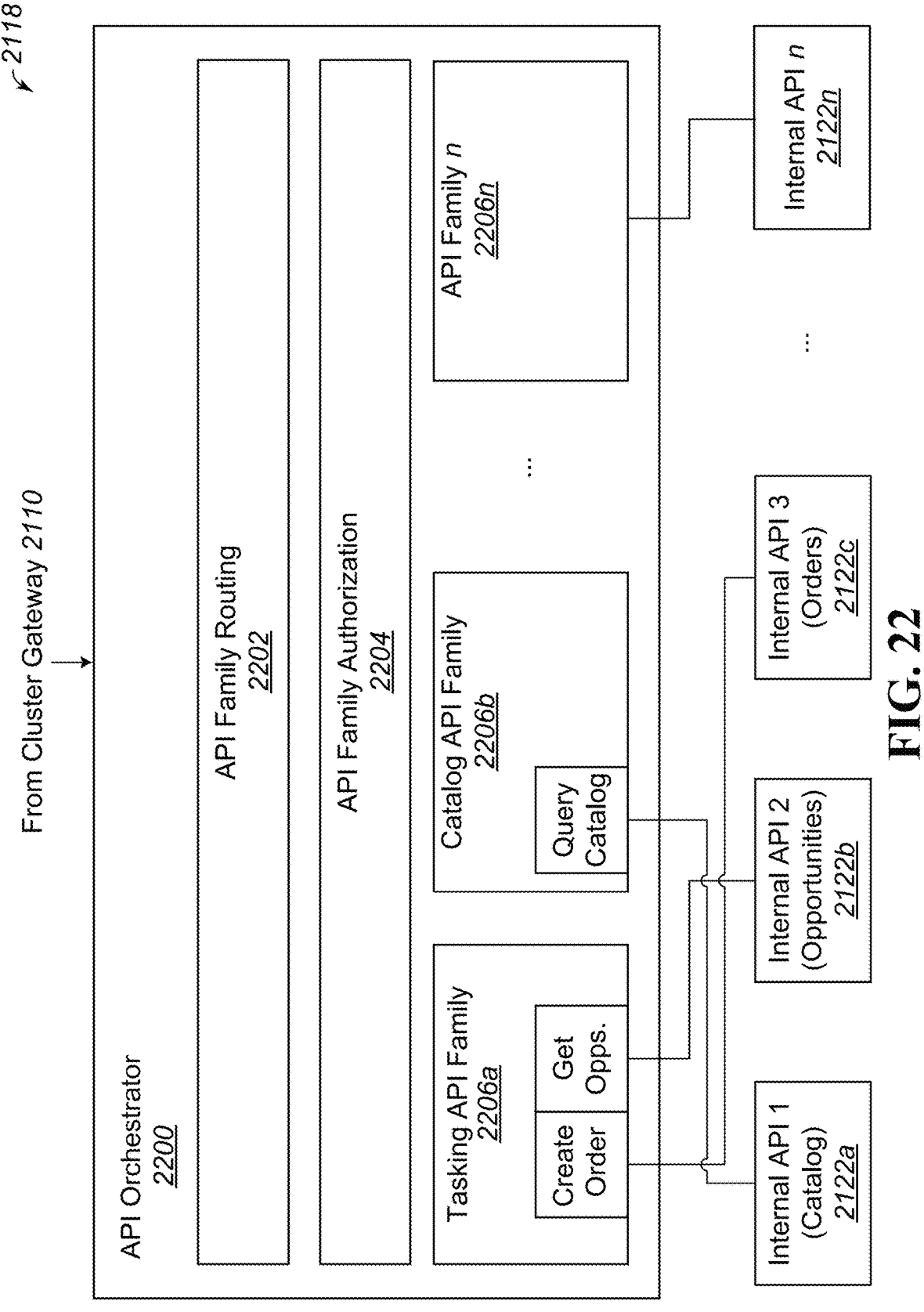
FIG. 22 is a schematic diagram of an API suite gateway comprising part of the schedule calculation module of FIG. 21, according to an embodiment of the disclosure.

More particularly, FIG. 22 is a block diagram of the API suite gateway 2118, which shows an example of how the gateway 2118 generates internal API calls. More particularly, the API suite gateway 2118 comprises an API orchestrator 2200 that:

receives inbound API requests to perform certain tasks from the customers 2102;

via an API family routing process 2202, determines the internal API families, internal API versions, and internal API use cases based on the inbound API requests and task performance rules;

via an API family authorization process 2204 and in particular by verifying customer identity using the identity provider 2120, ensures that the customers 2102 are authorized to access the required internal API families, internal API versions, and internal API use cases;

translates the customers' 2102 inbound API requests into calls to the appropriate internal APIs 2122; and translates the results of the internal API calls into responses to the customers 2102.

Collectively, the internal APIs 2122 accessible by the API orchestrator 2200 represent a "universal API" that embodies the different types of tasks that may be performed by the system 200 operator. More particularly, the API orchestrator 2200 exposes a set of external interfaces (e.g., the inbound API used by customers 2102) and determines what functionality from a set of internal services (e.g., the various types of functionality collectively exposed by the internal API families) are selected and combined in order to fulfil inbound requests.

An API family 2206 refers to a grouping of APIs that collectively represent a set of operations to interact with a particular subset of the system 200 operator's tasking-related resources. The functionality of the API families 2206 is used to implement the functionality of various virtual services, such as that offered by the Catalog, Opportunities, and Orders internal APIs 2122*a-c* discussed below. The API orchestrator 2200 selects and combines the functionality offered by various of these internal services in order to fulfill inbound API requests from customers 2102.

Each of the API families 2206 has its own unique label and may be formatted for human readability, such as by using slug case. For example, FIG. 22 depicts first through nth API families 2206*a-n* (generally, "API families 2206"), with the first API family 2206*a* (the "tasking API family 2206*a*") for determining what tasks may be performed by the satellite constellation and to actually assigning tasks to the constellation, and the second API family (the "catalog API family 2206*b*") for determining what captured and processed satellite images are available in the system 200 operator's image catalog. Other API families 2102 are also possible. For example, the API orchestrator 2200 may make different versions of the same API family 2102 available; additionally or alternatively, customized (e.g., for a particular customer 2102) and standardized instances of the same API family 2102 may be made available to the customers 2102. By defining a particular version of a particular API family 2206, customers 2102 are presented with known taxonomies, semantics, requests, and response formats.

As shown in FIG. 22, various API calls made via the API families 2206 are routed by the API orchestrator 2200 to corresponding internal APIs 2122. In FIG. 22, three examples of particular internal APIs 2122 are shown: a Catalog internal API 2122*a* to provide links to customers 2102 to download images obtained by the constellation of satellites, to permit customers 2102 to access private images stored on the system 200, and to enable customers 2102 to search and download images from the system's 200 public catalog of images; an Opportunities internal API 2122*b* that retrieves passes to be made by the satellite constellation to permit the schedule calculation module 302 to estimate when an image requested by any of the customers 2102 may be captured; and an Orders internal API 2122*c* that converts input from the tasking API family 2206*a* to data objects that downstream portions of the system 200 can process, and that generates a task identifier for each task assigned to the satellite constellation. Other internal APIs 2122 are additionally or alternatively possible. For example, an internal API may be called to verify match the identity of the individual making the inbound API request to a particular customer 2102 requesting a task be performed. In this example, the internal API may be called to associate the individual making the API call to a corporate customer 2102 associated with various task performance rules 2126.

As shown in FIG. 22, to perform a task assigned to the system 100' by one of the customers 2102, the tasking API family 2206*a* may first get a list of opportunities from the Orders internal API 2122*c* in order to determine whether the satellite constellation will be making a pass that will enable it to image a location of interest. Once it has that information, it may create an order to instruct the satellite constellation to perform a task comprising imaging that location of interest by communicating with the Orders internal API 2122*c*. The Orders internal API 2122*c* returns a task identifier permitting the tasking API 2206*a* to subsequently check on the status of that task. Once the imaging task has been completed, the catalog API family 2206*b* may query the image catalog 2122*c* using the Catalog internal API 2122*a* to obtain a link to obtain the captured image. The task identifier and link may be returned as responses to the inbound API call(s) made by the customers 2102.

Figure 19:
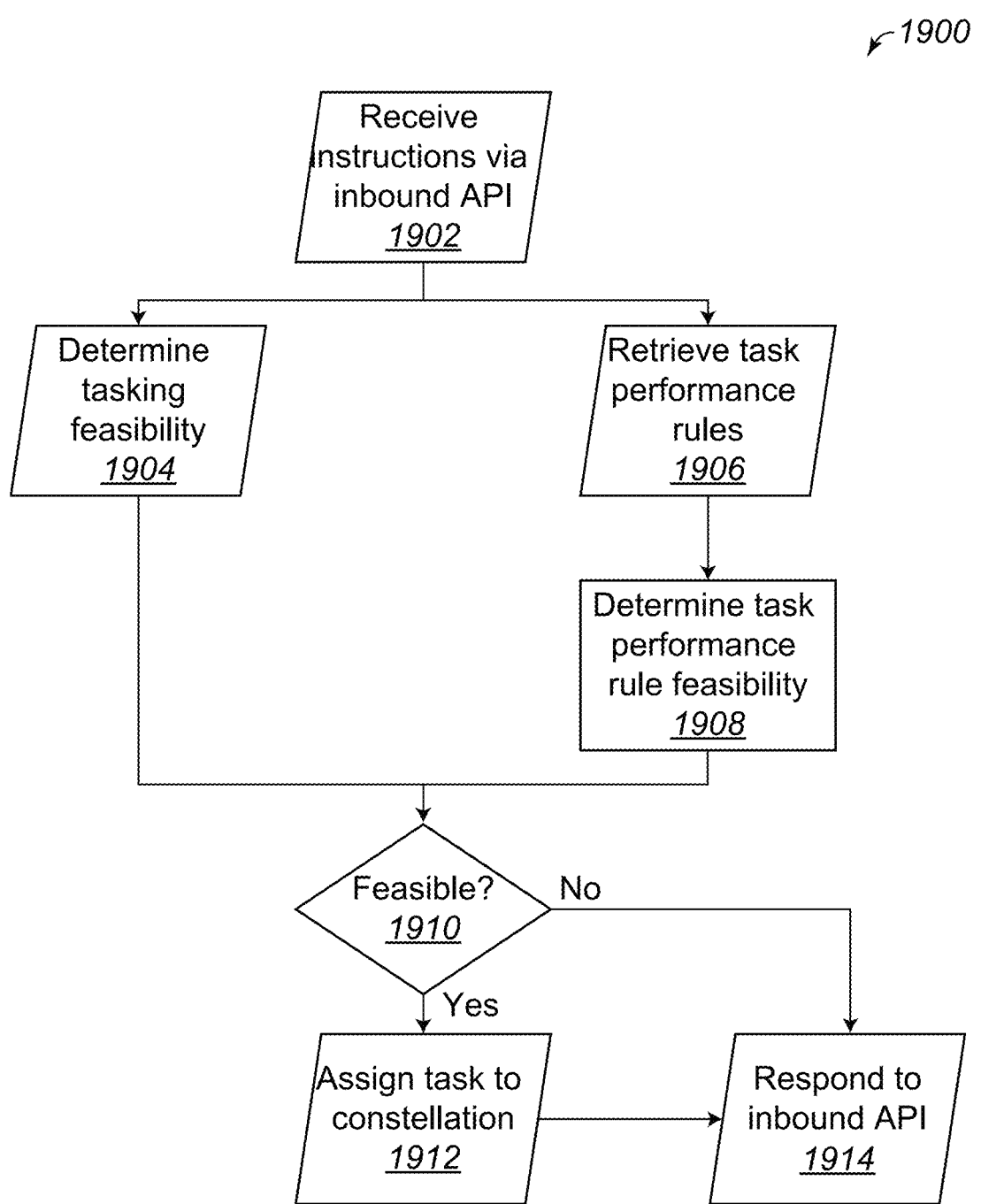
FIGS. 19 and 20 depict methods for performing a task using a constellation of satellites, according to embodiments of the disclosure.
Figure 20:
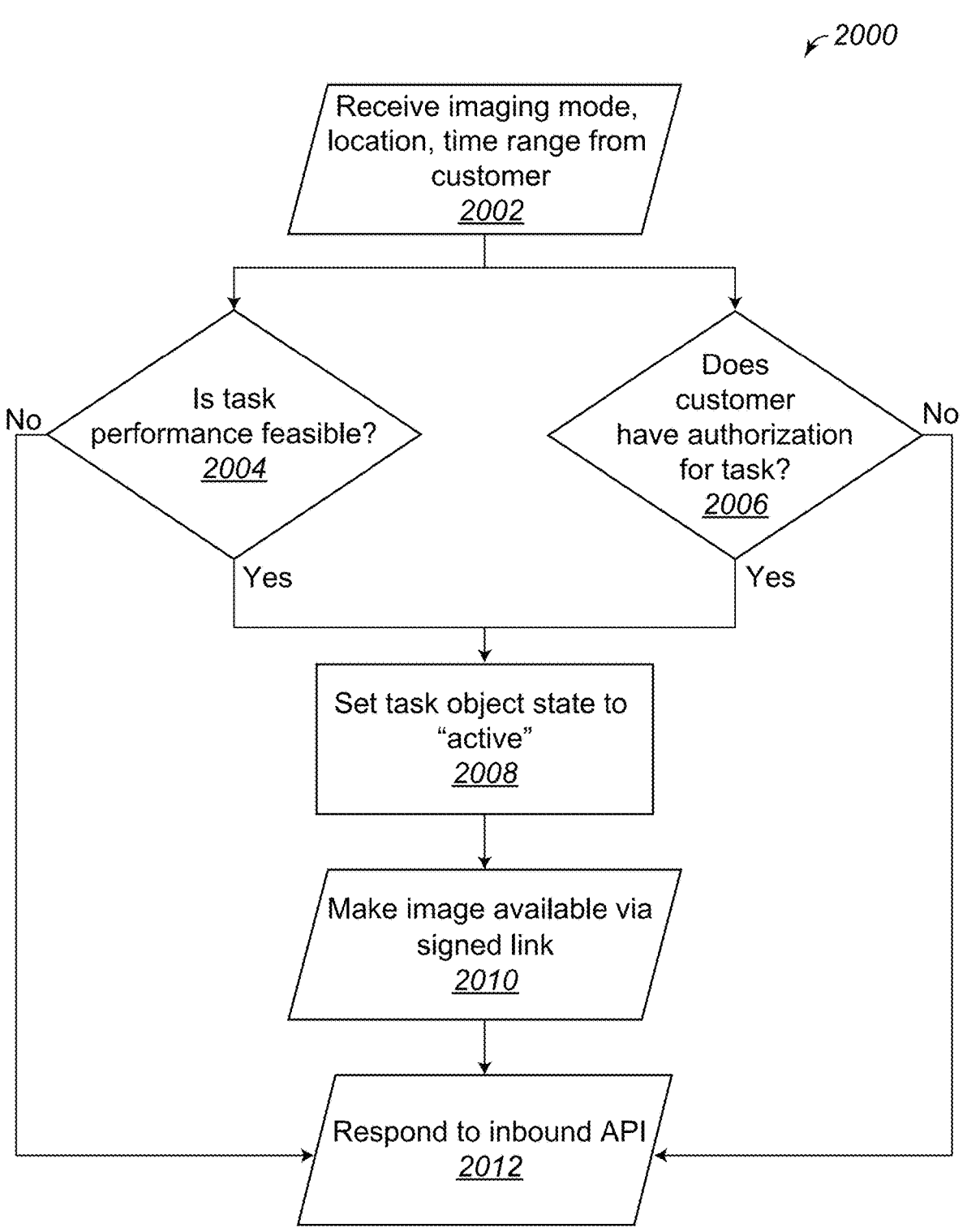

Referring now to FIGS. 19 and 20, there are respectively depicted methods 1900, 2000 for performing a task using a satellite constellation and the schedule calculation module 302 described above in respect of FIGS. 21 and 22. FIG. 19 is generally applicable to various types of tasks, while FIG. 20 is specifically in respect of assigning an image acquisition task to the satellite constellation.

In FIG. 19, the method 1900 begins at block 1902 where the instructions are received via the inbound API. For example, the API suite gateway 2118 may receive the inbound API call via the cluster gateway 2110, load balancer 2108, firewall 2106, and API gateway 2104, as described in respect of FIGS. 21 and 22. After receiving the instructions, the method 1900 proceeds to perform 1) block 1904 and 2) blocks 1906 and 1908 concurrently.

At block 1904, the method 1900 determines tasking feasibility without reference to any particular task performance rules 2126. For example, as described above in respect of block 1514 of FIG. 15, the schedule calculation module 302 determines which tasks are technically impossible and removes those from consideration. Analogously, at block 1904, those tasks that cannot be performed are flagged as impossible. At block 1910, the schedule calculation module 302 accordingly concludes the task is not feasible, and proceeds directly to block 1914 where a suitable response (e.g., an error message) is returned as a response to the inbound API call. For example, a task may be deemed technically not possible if it is in an area that physically cannot be imaged because of the location of the satellite constellation; if it is in an area that can be imaged but not within the time period specified by the customer because of the satellite constellation's location; because the satellite constellation is already at full capacity and cannot perform any more tasks; or because of maintenance or other technical impediments (e.g., hardware failures) prejudicing satellite constellation performance.

Assuming the task is not deemed impossible at block 1904, the outcome of blocks 1906 and 1908 is relevant for determining task feasibility at block 1910. At block 1906, the schedule calculation module 302 retrieves the task performance rules 2126 (e.g., from a database as depicted in FIG. 21), and at block 1908 determines whether the task can be performed in accordance with the task performance rules 2126. As described above, the task performance rules 2126 may comprise, for example, any one or more of in respect of an image acquisition task, a particular region of Earth to be imaged; the priority to be assigned to those tasks relative to other tasks and/or other customers (e.g., for an image acquisition task, a numerical priority ranking such as from 0-100, with higher priority tasks of one customer being performed prior to lower priority tasks from the same and other customers); in respect of an image acquisition task, a default imaging mode (e.g., "spotlight" or "stripmap", as described above); an expected task completion date and/or time (e.g., for an image acquisition task, delivery of the consequent image within 1, 3, or 8 hours from the customer placing the request); or for an image acquisition task, whether the resulting image will be private to the customer or publicly available. The schedule calculation module 302 at block 1908 then determines whether the task is feasible in view of those rules 2126.

Generally speaking, the delineation between the task feasibility determined at blocks 1904 and 2004, and the feasibility based on task performance rules at blocks 1908 and 2006, is that the former is based on technical feasibility absent the constraint of any of the task performance rules 2126 agreed upon between customers 2102 and the system's 100' operator, and that the latter considers the impact of the task performance rules 2126 assuming technical feasibility is possible. For example, a satellite constellation that is unable to perform the task of imaging an area because of insufficient satellite coverage would fail to satisfy blocks 1904 and 2004. In contrast, task performance rules 2126 may prevent image acquisition for reasons such as the customer 2102 having exhausted an allotted quota of imaging tasks for a certain time period or not having authorization to image a certain area, for example.

As another example, if the task performance rules 2126 for the customer 2102 is to always acquire an image of a certain area (e.g., an area that is prone to flooding) within 24 hours of the customer's 2102 request having been made with a priority level of 50 (on a scale of 1-100), it may be that all satellites in the constellation capable of imaging that area within 24 hours are occupied by higher priority tasks. In that case, the outcome of block 1908 is that the task is not feasible in view of the task performance rules 2126, and consequently the method 1900 proceeds to block 1914 directly from block 1910 as described above.

If, in contrast, the task is found feasible at blocks 1904 and 1908, then it is assigned to the satellite constellation at block 1912 through the one or more internal APIs 2122 as discussed above. After the task has been assigned, the method 1900 proceeds to block 1914 where a positive response is made to the inbound API.

While FIG. 19 shows blocks 1904 and 1906 performed concurrently, in at least some other embodiments (not depicted), those blocks 1904, 1906 may alternatively be performed sequentially, with either block 1904 or block 1906 being performed first.

Referring now to FIG. 20, there is shown a method 2000 specifically in respect of assigning an image acquisition task to the satellite constellation. In other words, the method 2000 is directed at a particular example embodiment in which one of the customers 2102 wishes to instruct the satellite constellation to acquire an image of a particular location on Earth.

At block 2002, the schedule calculation module 302 receives instructions from one of the customers 2102 via an inbound API call. In this example, the schedule calculation module 302 receives information on imaging mode, imaging location, and a time range at or during which the image is to be obtained. These may be passed as parameters of the inbound API call. For example, the imaging location may be specified as a point of interest to image; the imaging mode may be specified as a ground resolution of the image to be acquired and dimensions of an imaging area comprising the point of interest to image; and the time range may specify a particular time and/or date, or a time window during which the image is to be captured.

While the above provides three examples of parameters that can be passed to the schedule calculation module 302 via the inbound API call, other parameters may additionally or alternatively be passed to the schedule calculation module 302 by the customer 2102. For example, the customer 2102 may further specify a set of task performance rules. In such an example, the customer 2102 may have pre-arranged with the operator of the system 100' to have different task performance rules for different types of tasks. For example, the customer 2102 may have a first set of task performance rules 2126 that specify certain tasks (e.g., acquiring images of a flooded area) are to be assigned a high priority (e.g., a priority of 100 on a scale of 1-100), and that the customer 2102 is to pay a certain price when those rules 2126 are applied; and the customer 2102 may also have a second set of task performance rules 2126 that specifies all other tasks are to be assigned a lower priority (e.g., a priority of 50 on a scale of 1-100) and that those images are to cost the customer 2102 less than the higher priority tasks governed by the first set of rules 2126.

Following block 2002, the method 2000 proceeds to perform blocks 2004 and 2006 concurrently. At block 2004, the schedule calculation module 302 determines whether task performance is feasible in a manner analogous to that described in respect of block 1904 of FIG. 19, above. Similarly, at block 2006, the schedule calculation module 302 determines whether the proposed task is feasible in view of the applicable task performance rules 2126 in a manner analogous to blocks 1906 and 1908 as described in respect of FIG. 19 above. In the context of block 2006, however, the feasibility determination is expressed as whether the customer 2102 has authorization to perform the proposed task. For example, the task performance rules 2126 may comprise any one or more of:

a task priority to be assigned to the task;
   a list of satellites comprising the satellite constellation to be used for the task;
   a pass direction parameter specifying a pass direction of the satellite constellation when imaging;
   a look side direction parameter specifying a look side of the satellite constellation when imaging;
   a downlink latency parameter specifying a maximum download latency for the satellite constellation when sending the acquired image to a ground station;
   a ground assets parameter specifying a location of the ground station; or an incidence angle parameter specifying an incidence angle of the satellite constellation when imaging.

For example, in an embodiment in which the task performance rules 2126 specify that any image acquisition task corresponding to the imaging mode, location, and time range received at block 2002 is to be assigned a priority of 50 on a scale of 1-100, if higher priority tasks will monopolize the imaging capacity of the satellite constellation during the recited time range then the customer 2102 would not have authorization for the task. Conversely, if the task performance rules 2126 specified that any image acquisition task corresponding to the imaging mode, location, and time range received at block 2002 is to be assigned a priority of 100 on a scale of 1-100, then even if other lower priority tasks would have otherwise monopolized the satellite constellation's imaging capacity during the recited time range the customer 2102 would nonetheless have authorization for the task by virtue of their relatively high priority giving their task precedence over the lower priority tasks scheduled for the same time.

As another example, in an embodiment in which the task performance rules 2126 specify that any image acquisition task corresponding to the imaging mode, location, and time range received at block 2002 is to be acquired at a particular incidence angle, then it would not be technically possible to acquire the image in accordance with the task performance rules 2126 if no satellite would be available to acquire the image at the specified incidence angle. In such a case, even if task performance would be permitted at block 2006, it would be found not feasible to perform the task at block 2004.

In the event the task is not found feasible or authorized at blocks 2004 and 2006, the method 2000 proceeds directly to block 2012 and responds negatively to the inbound API request, as described above in respect of block 1914.

While FIG. 20 shows blocks 2004 and 2006 performed concurrently, in at least some other embodiments (not depicted), those blocks 2004, 2006 may alternatively be performed sequentially, with either block 2004 or block 2006 being performed first. Furthermore, in at least some other embodiments, block 2006 may be replaced with blocks 1906 and 1908.

Assuming that the task is found feasible and authorized at blocks 2004 and 2006, the method 2000 proceeds to block 2008 where the schedule calculation module 302 sets a task object state corresponding to the assigned task to "active". Once the task is complete, the schedule calculation module 302 sets the task object state to "completed" (not shown), and if an error occurs while attempting to perform the task the schedule calculation module 302 sets the task object state to "error" (not shown). The customer 2102 who requested the task be performed can periodically poll the schedule calculation module 302 to assess task status, as discussed further below.

Assuming the imaging task is successfully performed and the image is acquired in accordance with the inbound API request and the task performance rules 2126, at block 2010 the schedule calculation module 302 makes the image available via a signed link. That is, the schedule calculation module 302 stores the image at a location (e.g., S3™ cloud storage) and generates a digitally signed link for sending to the customer 2102 who made the task request. This signed link is sent to the customer 2102 as a response to the inbound API request at block 2012. In addition to or as an alternative to providing the image via a link, the method 2000 may comprise returning a copy of the image as a response to the inbound API request.

In at least some example embodiments, it can take several hours for the satellite constellation to acquire an image. In such a case, the schedule calculation module 302 may respond to the inbound API request before any image is available. For example, the schedule calculation module 302 may respond to the inbound API request with at least one of the following pieces of information:

the task identifier identifying the task;

a rules identifier identifying the set of task performance rules 2126 under which the task is to be performed;

a start time and an end time of an acquisition window during which the image is to be acquired;

the point of interest that is to be imaged;

the imaging mode to be used for imaging;

the status of the task, as described above;

a time when the task was created;

a time when the task was first updated (e.g., from "active" to "error"); or an image format type of the image.

Some of this information may duplicate information comprising part of the inbound API request or the stored task performance rules 2126. However, it may still be included in the API response so as to confirm to the customer 2102 that the task has been processed as expected.

In the event the schedule calculation module 302 responds to the inbound API request before any image is available and provides the task identifier to the customer 2102, the customer 2102 may periodically poll the schedule calculation module 302 to determine the status of the task. For example, the customer 2102 may wish to determine whether the task remains active and in progress; has failed due to an error; or is complete and obtain a copy of the acquired image or a link to that image. In this example, after making an initial inbound API call that results in the task being assigned to the constellation of satellites, the customer 2102 may make a subsequent inbound API call specifying the task identifier and requesting a status of the task. In response, the schedule calculation module 302 may respond to the subsequent inbound API call with the status of the task. If the task has been completed, the response may also comprise a copy of the acquired image or a link to it. In at least some embodiments, communication with the customer 2102 via the inbound API request and responses to it are performed synchronously, while the API suite gateway 2118 obtains information on task status from the downstream, internal APIs 2122 at least partially asynchronously. In at least some other embodiments, communication with the customers 2102 may also be done asynchronously such that the schedule calculation module 302 can push status updates to the customers 2102. As another example, the downstream communication between the API suite gateway 2118 and the internal APIs 2122 may also be done at least partially synchronously.

Additionally or alternatively, in at least some embodiments any of the customers 2102 may make an API call specifying a set of task performance rules 2126 to determine which tasks that customer 2102 has associated with that set of rules 2126. For example, a customer 2102 may have two different sets of task performance rules 2126 with the system 100' operator corresponding to two different contracts. Set 1 may be a higher priced contract that specifies a relatively high task priority, while set 2 may be a lower priced contract that specifies a relatively low task priority. In an example in which the customer 2102 has assigned a task to set 1 in accordance with the method 2000 of FIG. 20, the customer 2102 may subsequently make an inbound API call specifying set 1 of the task performance rules 2126, and the schedule calculation module's 302 response may specify the task governed by set 1 together with any past tasks governed by set 1. The listing of past tasks may comprise tasks of varying statuses and/or over various time frames. The customer 2102 may also analogously inquire to obtain a list of past tasks governed by set 2, even if no such tasks are currently active (e.g., all past tasks governed by set 2 may have already returned images or image links).

In the described embodiments, the system may be implemented as any form of a computing and/or electronic device. Such a device may comprise one or more processors which may be microprocessors, controllers, or any other suitable type of processors for processing computer-executable instructions to control the operation of the device. In some examples, for example where a system-on-a-chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer-readable instructions, data structures, program modules, or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and Blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, software transmitted from a website, server, or other remote source using a coaxial cable, fiber optic cable, twisted pair, DSL, or wireless technologies such as infrared, radio, and microwave is included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although illustrated as a single system, it is to be understood that the computing device may be a distributed system.

Thus, for instance, several devices may be in communication by way of a network connection and may collectively perform tasks described as being performed by the computing device.

Although illustrated as a local device, it will be appreciated that the computing device may be located remotely and accessed via a network or other communication link (for example, using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants, and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms 'component' and 'system' are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term 'exemplary' is intended to mean 'serving as an illustration or example of something'.

Further, to the extent that the term 'includes' is used in either the detailed description or the claims, such term is intended to be inclusive in a manner similar to the term 'comprising' as 'comprising' is interpreted when employed as a transitional word in a claim.

The FIGS. illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

It is furthermore contemplated that any part of any aspect or embodiment discussed in this specification can be implemented or combined with any part of any other aspect or embodiment discussed in this specification.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

The invention claimed is:

1. A method for assigning an image acquisition task to a constellation of satellites, the method comprising:

receiving a request via an inbound API call to assign the image acquisition task to the constellation of satellites, wherein the request comprises a time at or during which at least one image is to be acquired by the constellation;

retrieving, based on the request, at least one task performance rule specifying how the task is to be performed;

generating at least one internal API call to task the constellation of satellites to perform the task, wherein the at least one API call specifies the time at or during which the task is to be performed and the at least one task performance rule; and assigning the task to be performed by the constellation of satellites by making the at least one internal API call, wherein the inbound API call further comprises a reference to a set of task performance rules comprising the at least one task performance rule and specific to a user making the inbound API call, and wherein the method further comprises, after the task has been assigned:

receiving a subsequent inbound API call specifying the set of task performance rules; and responding to the subsequent inbound API call specifying the task and any other tasks governed by the set of task performance rules.

2. The method of claim 1, wherein the request further comprises a point of interest to be imaged and an imaging mode, wherein the imaging mode specifies a ground resolution of the at least one image to acquire and dimensions of an area comprising the point of interest to image, and wherein the at least one internal API call further specifies the point of interest and the imaging mode.

3. The method of claim 2, further comprising responding to the request with a response comprising at least one of a task identifier identifying the task, a rules identifier identifying a set of task performance rules under which the task is to be performed, a start time and an end time of an acquisition window during which the at least one image is to be acquired, the point of interest, the imaging mode, a status of the task, a time when the task was created, a time when the task was first updated, or an image format type of the at least one image.

4. The method of claim 1, wherein the at least one internal API call further specifies a task priority, wherein the task is one of a plurality of competing tasks that have been assigned to the constellation of satellites, and wherein the method further comprises performing the task ahead of at least some of the plurality of competing tasks that have been earlier assigned than the task based on the task priority.

5. The method of claim 4, wherein the at least one internal API call further specifies at least one additional parameter, wherein the at least one additional parameter is at least one of a list of satellites comprising the constellation, a pass direction parameter specifying a pass direction of the constellation of satellites when imaging, a look side direction parameter specifying a look side of the constellation of satellites when imaging, a downlink latency parameter specifying a maximum download latency for the constellation of satellites when sending the at least one image to a ground station, a ground assets parameter specifying a location of the ground station, or an incidence angle parameter specifying an incidence angle of the constellation of satellites when imaging.

6. The method of claim 5, wherein at least one value for the at least one additional parameter is specified in the at least one task performance rule.

7. The method of claim 1, wherein the at least one internal API call is made to at least one of a catalog API for permitting searching of an image catalog and downloading of acquired images, an opportunities API for retrieving passes to be made by the constellation of satellites to permit estimation of when the at least one image may be captured, an orders API for data conversion to permit calling the at least one internal API and to generate a task identifier, or a customers API for verifying an identity of a customer requesting performance of the task.

8. The method of claim 1, further comprising determining that the constellation of satellites is technically capable of performing the task prior to assigning the task to the constellation of satellites for performance.

9. The method of claim 1, further comprising determining that the task can be performed in accordance with the at least one task performance rule prior to assigning the task to the constellation of satellites for performance.

10. The method of claim 1, further comprising, prior to assigning the task to the constellation of satellites for performance:
determining that the constellation of satellites is technically capable of performing the task; and
determining that the task can be performed in accordance with the at least one task performance rule.

11. The method of claim 1, further comprising responding to the request with a copy of or link to the at least one image acquired as a result of performing the task.

12. The method of claim 1, further comprising verifying an identity of a user making the inbound API call and that the user is permitted to cause the constellation of satellites to perform the task after receiving the request and before generating the at least one internal API call.

13. The method of claim 1, further comprising:
responding to the request with a response comprising a task identifier identifying the task; and
after the task has been assigned:
receiving a subsequent inbound API call specifying the task identifier and requesting a status of the task;
determining a status of the task; and
responding to the subsequent inbound API call with the status of the task.

14. The method of claim 13, wherein:
responding to the request, and receiving and responding to the subsequent inbound API call are performed synchronously; and
determining the status of the task is at least partially performed asynchronously.

15. The method of claim 1, wherein generating the at least one internal API call comprises routing the inbound API call to at least one API family based at least on a base URL of the inbound API call.

16. The method of claim 15, wherein the at least one API family comprises different API families and the at least one internal API call comprises different internal API calls made to different internal APIs, and wherein at least one of the different API families calls multiple of the different internal APIs.

17. A system for assigning a task to a constellation of satellites, the system comprising:
at least one network interface card; and
at least one controller communicatively coupled to the network interface card and configured to perform a method comprising:
receiving, via the at least one network interface card, a request via an inbound API call to assign an image acquisition task to the constellation of satellites, wherein the request comprises a time at or during which at least one image is to be acquired by the constellation;
retrieving, based on the request, at least one task performance rule specifying how the task is to be performed;
generating at least one internal API call to task the constellation of satellites to perform the task, wherein the at least one API call specifies the time at or during which the task is to be performed and the at least one task performance rule; and
assigning the task to be performed by the constellation of satellites by making the at least one internal API call,
wherein the inbound API call further comprises a reference to a set of task performance rules comprising the at least one task performance rule and specific to a user making the inbound API call, and
wherein the method further comprises, after the task has been assigned:
receiving a subsequent inbound API call specifying the set of task performance rules; and
responding to the subsequent inbound API call specifying the task and any other tasks governed by the set of task performance rules.

18. The system of claim 17, wherein the request further comprises a point of interest to be imaged and an imaging mode, wherein the imaging mode specifies a ground resolution of the at least one image to acquire and dimensions of an area comprising the point of interest to image, and wherein the at least one internal API call further specifies the point of interest and the imaging mode.

19. At least one non-transitory computer readable medium having stored thereon computer program code that is executable by at least one processor and that, when executed by the at least one processor, causes the at least one processor to perform a method for assigning a task to a constellation of satellites, the method comprising:

receiving a request via an inbound API call to assign an image acquisition task to the constellation of satellites, wherein the request comprises a time at or during which at least one image is to be acquired by the constellation;

retrieving, based on the request, at least one task performance rule specifying how the task is to be performed;

generating at least one internal API call to task the constellation of satellites to perform the task, wherein the at least one API call specifies the time at or during which the task is to be performed and the at least one task performance rule; and assigning the task to be performed by the constellation of satellites by making the at least one internal API call,

wherein the inbound API call further comprises a reference to a set of task performance rules comprising the at least one task performance rule and specific to a user making the inbound API call, and wherein the method further comprises, after the task has been assigned:

receiving a subsequent inbound API call specifying the set of task performance rules; and responding to the subsequent inbound API call specifying the task and any other tasks governed by the set of task performance rules.

20. The at least one non-transitory computer readable medium of claim 19, wherein the request further comprises a point of interest to be imaged and an imaging mode, wherein the imaging mode specifies a ground resolution of the at least one image to acquire and dimensions of an area comprising the point of interest to image, and wherein the at least one internal API call further specifies the point of interest and the imaging mode.

* * * * *